United States Patent
Rune et al.

(10) Patent No.: US 9,220,110 B2
(45) Date of Patent: Dec. 22, 2015

(54) NODE SELECTION IN A PACKET CORE NETWORK

(75) Inventors: Johan Rune, Lidingö (SE); Åke Arvidsson, Solna (SE); Attila Mihály, Dunakeszi (HU)

(73) Assignee: Telefonaktiebolaget L M Ericsson (Publ), Stockholm (CH)

( * ) Notice: Subject to any disclaimer, the term of this patent is extended or adjusted under 35 U.S.C. 154(b) by 21 days.

(21) Appl. No.: 13/811,450

(22) PCT Filed: Jul. 22, 2010

(86) PCT No.: PCT/EP2010/060652
§ 371 (c)(1),
(2), (4) Date: Jan. 22, 2013

(87) PCT Pub. No.: WO2012/010209
PCT Pub. Date: Jan. 26, 2012

(65) Prior Publication Data
US 2013/0121298 A1    May 16, 2013

(51) Int. Cl.
| | |
|---|---|
| H04W 4/00 | (2009.01) |
| H04W 72/08 | (2009.01) |
| H04L 29/12 | (2006.01) |
| H04W 8/26 | (2009.01) |
| H04W 72/00 | (2009.01) |
| H04W 76/02 | (2009.01) |

(52) U.S. Cl.
CPC ....... *H04W 72/085* (2013.01); *H04L 29/12066* (2013.01); *H04L 61/1511* (2013.01); *H04W 8/26* (2013.01); *H04W 72/00* (2013.01); *H04W 76/02* (2013.01)

(58) Field of Classification Search
CPC .................. H04W 36/0005; H04W 36/0016; H04W 36/0055; H04W 36/0072; H04W 36/0077
USPC ......... 370/329, 328, 335, 254, 331, 310, 468, 370/401, 431
See application file for complete search history.

(56) References Cited

U.S. PATENT DOCUMENTS

| | | | |
|---|---|---|---|
| 2005/0159156 A1 | 7/2005 | Bajko et al. | |
| 2009/0240795 A1* | 9/2009 | Tsirtsis et al. | 709/223 |
| 2011/0142015 A1* | 6/2011 | Shaikh et al. | 370/338 |
| 2013/0272256 A1* | 10/2013 | Mihaly et al. | 370/329 |

FOREIGN PATENT DOCUMENTS

| | | | |
|---|---|---|---|
| EP | 1 587 272 A1 | | 10/2005 |
| WO | WO 2009/092440 A1 | | 7/2009 |
| WO | WO 2009/150003 A1 | | 12/2009 |

OTHER PUBLICATIONS

3GPP. 3rd Generation Partnership Project; Technical Specification Group Core Network and Terminals; Domain Name System Procedures; Stage 3 (Release 9). 3GPP TS 29.303 v9.2.0, Sep. 22, 2010.

* cited by examiner

*Primary Examiner* — Chi H Pham
*Assistant Examiner* — Alexander O Boakye

(57) ABSTRACT

A method of allocating user plane nodes to a connection being established across a packet core network. The method comprises maintaining at a Domain Name System, DNS, server, one or more DNS resource records for each available user plane node or group of neighboring user plane nodes, a DNS resource record containing a measure of a route quality or cost between the associated user plane node(s) or group(s) and each of one or more further user plane nodes or further groups of neighboring user plane nodes of the packet core network to which said associated user plane node(s) or groups is(are) connected. A connection establishment request is processed at a mobility management control entity within the packet core network, with a DNS query being sent to a DNS server, the query containing one or more user plane node selection criteria. The query is received at the DNS server and, on the basis of the or each criterion, one or more DNS resource records satisfying the criteria/criterion identified. At least said measure of route quality or cost of the identified DNS resource record(s) is returned to said mobility management control entity. The measure(s) of route quality or cost of the identified DNS resource record(s) is received at the mobility management control entity, and the measure(s) used to allocate a user plane node or nodes to said connection.

27 Claims, 10 Drawing Sheets

| S-NAPTR Resource Record Data | | | | | |
|---|---|---|---|---|---|
| example.com | | | | | Comment |
| RR class (Internet) | RR type | Order | Pref | Flags | Data described in the comment column |
| IN | NAPTR | 100 | 10 | "a"/"s"/"u" | Example-service:example-protocol | FQDN to match the FQDN in the query. |
| | | | | | Service:protocol |
| | | | | | "" | Regexp |
| | | | | | replacement-example.com | Replacement |

*Figure 2*

NODE SELECTION IN A PACKET CORE NETWORK

TECHNICAL FIELD

The present invention relates to a method and apparatus for achieving node selection within a packet network. The invention is applicable in particular, though not necessarily, to the so-called Evolved Packet System and to networks implementing or developed from this system.

BACKGROUND

Most currently deployed cellular telephone systems conform to either the GSM standards or to the newer 3G standards. Work is ongoing to develop and deploy next generation networks and standards, the foremost of which is the 3GPP's Evolved Packet System (EPS)—also known as Long Term Evolution/System Architecture Evolution (LTE/SAE)—standard. Within EPS, the Evolved Packet Core (EPC) employs the EPS standards and is the replacement for the 2G and 3G packet core known as the General Packet Radio Service (GPRS) core.

FIG. 1 is a simplified illustration of the EPs network architecture. The main components of the EPC are:

- MME (Mobility Management Entity): The MME is the key control-node for the LTE access-network. It is responsible for idle mode UE (User Equipment) tracking and paging procedures including retransmissions. Among other tasks, it is involved in the bearer activation/deactivation process and is also responsible for choosing the SGW and the PGW for a UE at the initial attach and the SGW at time of intra-LTE handover involving SGW relocation.
- SGW (Serving Gateway): The SGW routes and forwards user data packets, while also acting as the mobility anchor for the user plane during inter-eNodeB (eNB) handovers and as the anchor for mobility between LTE and other 3GPP technologies (terminating the S4 interface and relaying the traffic between 2G/3G systems and a PGW).
- PGW (Packet Data Network (PDN) Gateway): The PDN Gateway provides connectivity from the UE to external packet data networks by being the point of exit and entry of traffic for the UE. A UE may have simultaneous connectivity with more than one PGW for accessing multiple PDNs.

A bearer for a Packet Data Network (PDN) connection spans a number of user plane nodes including the UE, the eNB, the Security Gateway (SeGW) at the border of the operator network, the Serving Gateway (SGW) and the PDN Gateway (PGW). In many cases the path of the traffic over the PDN connection continues from the PGW to an Autonomous System Border Router (ASBR), i.e. one of the operator's border routers constituting a "peering" point with other carriers, and further into the Internet.

When a PDN connection is established, or its path is altered, some or all of the traversed nodes need to be selected (or reselected). Different selection mechanisms are used for different nodes as follows:

- The eNB is selected by the UE, governed by radio conditions and guiding parameters in the system information broadcast in the radio access network cells. [An exception is inter-eNB handover, where the source eNB, aided by measurement data from the UE, selects the target cell (and thus target eNB) for the handover.]
- The SeGW selection is a consequence of the eNB selection, since the SeGW that the eNB is connected to must be used.
- The SGW is selected by the MME.
  The SGW is selected for the default bearer at network "Attach". A UE can only have a single SGW allocated at a time, so the same SGW is used also for subsequent bearers, irrespective of Access Point Name (APN). The allocated SGW can be changed due to mobility, e.g. at handover or Tracking Area Update (TAU), in order to optimize the route or because the old SGW does not serve the new eNB. A SGW may serve a limited part of the PLMN's area (i.e. a limited fraction of the eNBs in the PLMN), denoted SGW Service Area (SA). SGW relocation due to fault situations is also possible.
- The PGW is selected by the MME.
  The PGW is selected for the default bearer for a certain APN. A UE can only have a single PGW allocated at a time for a certain APN, so the same PGW is used also for subsequent bearers for the same APN.
  A PGW is allocated to the UE for each APN the UE chooses to use for communication (i.e. to establish a bearer for). Hence, a UE can be allocated multiple PGWs, one for each APN.
  An allocated PGW is not changed—it remains the same irrespective of mobility for as long as the UE remains attached to the network (for each APN). Hence, each PGW must serve the entire PLMN.
- The ASBR is selected through routing information and policies in the transport network layer and may hence in essence be seen as a consequence of the PGW selection. In a roaming scenario, where the operators of the visited and home PLMNs have established a mutual peering arrangement using a dedicated ASBR, ASBR selection is essentially a consequence of the PLMNs involved. If the two PLMNs have multiple dedicated ASBRs for mutual peering, then the choice among these ASBRs may be a consequence of the PGW selection.

In general, the various conceivable selection criteria that an MME may consider can be classified into "hard" and "soft" criteria. A hard selection criterion is a criterion that must be fulfilled by the selected node. For example, a selected PGW must support the APN that is associated with the concerned PDN connection and a selected SGW must serve the area (cell/eNB) where the UE is located. A soft selection criterion is a criterion that may or may not be fulfilled. Soft criteria can often be fulfilled to a varying degree—the more the better. Examples that are applicable to both SGW and PGW selection include path optimization (e.g. topological closeness) and load balancing.

SGW/PGW selection takes place in the network whenever a SGW and/or a PGW needs to be allocated to a UE, either to serve a new PDN connection (i.e. a new APN) or to replace a previously allocated SGW. The following are three cases in which SGW/PGW selection is triggered:

- Attach (which includes establishment of an initial PDN connection and default bearer). In this selection case both SGW and PGW are selected.
- SGW relocation. In this selection case only the SGW is selected, while the PGW(s) remain(s) fixed.
- Additional PDN connection establishment (for an additional APN). In this selection case only a PGW is selected, while the already allocated SGW is reused.

According to presently applicable 3GPP specification TS 29.303 v8.3.0 and TS 23.003 v9.0.0, the mechanisms that the MME can leverage to enable appropriate selections of SGWs/

PGWs employ a DNS lookup mechanism and are based on the Straightforward Name Authority Pointer (S-NAPTR) DNS application. S-NAPTR is specified in L. Daigle & A. Newton, "Domain-Based Application Service Location Using SRV RRs and the Dynamic Delegation Discovery Service (DDDS)", RFC 3958, January 2005, and uses NAPTR and SRV resource records (RRs), but with certain restrictions in the flexibility of what is allowed in the NAPTR RRs. FIG. 2 shows an exemplary NAPTR RR obeying the S-NAPTR restrictions, where the flags are restricted to the "a", "s" or " " (no flag) flags and the regexp field is unused (i.e. it is empty). The values of the order and pref fields are merely examples. A RR includes an FQDN that is built up by multiple labels separated by dots (e.g. foo.example.com). The "< >" characters are often used to indicate a generic FQDN or label format in which the expressions within the brackets are supposed to be replaced by some real value/expression in order to form a specific (usable) FQDN/label. Using this notation, a generic expression for a three-label FQDN could be <label1>.<label2>.<top-domain-label>.

In this context, S-NAPTR is utilized to indicate SGWs/PGWs which match the present selection case, e.g. in terms of supported APN, supported mobility protocol, support of the current location (Tracking Area) and/or topological closeness. This information is stored in NAPTR resource records (RRs) in the DNS server(s):

TAI→SGW mapping: The TAI is encoded in the field matching the FQDN in the query in the form of two labels for the TAC (one for the low byte, tac-lb<TAC low byte>, and one for the high byte, tac-hb<TAC high byte>) to the left of the label "tac" in an FQDN ending with: epc.mnc<MNC>.mcc<MCC>.3gppnetwork.org (which thus includes the PLMN ID which complements the TAC into a TAI).

An example could be: tac-lb231.tac-hb14.tac.epc.mnc2.mcc46.3gppnetwork.org

Supported mobility protocol→SGW/PGW mapping: The supported mobility protocol may be encoded in the service field.

Supported APN→PGW mapping: The APN is encoded in the field matching the FQDN in the query in the form of multiple labels, the rightmost of which should be "apn", in an FQDN ending with epc.mnc<MNC>.mcc<MCC>.3gppnetwork.org, for example: internet.apn.epc.mnc2.mcc46.3gppnetwork.org or, generically, <apn-label-1>.[ . . . <<apn-label-n>.] apn.epc.mnc<MNC>.mcc<MCC>.3gppnetwork.org).

Topological closeness: The topological information may be encoded in the FQDNs in the replacement field in the form of multiple labels constituting the "node name". By comparing the node names of two different GWs (typically a SGW and a PGW), the MME may infer the relative topological closeness of the nodes from the number of consecutive identical labels (starting with the rightmost node name label)—the more identical labels, the closer the two nodes. Appending the label "topon" as the leftmost label indicates that topologically significant information has been encoded in the node name labels. A node name is canonical in the sense that it should be the same for all interfaces of a node (in case the node is multi-homed). Multiple (non-equivalent) interfaces of the same node, allocated for different services or connected to different networks, are distinguished by the first label to the left of the node name.

FIG. 3 illustrates at a high level the DNS lookup procedure performed within the EPC including initial exchanges to identify suitable SGW(s) and PDN(S) and subsequent exchanges to obtain IP addresses for the selected SGW(s) and PDN(s).

To let all of the above information impact the SGW/PGW selection, multiple NAPTR RRs have to be retrieved, corresponding to multiple DNS queries. However, the DNS mechanisms contain optimizations that drastically reduce the number of DNS queries required in practice. DNS servers send "additional section" information in their replies, which attempt to foresee and preclude subsequent requests and, in addition, DNS clients cache received DNS replies (although no longer than the lifetime indicated in the reply), which eliminates the majority of the queries. Nevertheless, even though most of the DNS queries are avoided, a series of FQDNs (corresponding to potential queries) are involved in the procedure from the FQDN in the initial query to the FQDN in the finally returned A/AAAA resource record. The structure of the initial (input) FQDN and final (output) are specified by 3GPP, but the (arbitrary number of) intermediate FQDNs are left entirely to each operator to use in any way they assess beneficial, e.g. to encode other SGW/PGW properties which may be useful in the SGW/PGW selection process.

The above described DNS assisted SGW/PGW selection mechanism has several deficiencies in terms of path optimization (i.e. SGW/PGW selection based on topological information):

The node name label matching principle provides only coarse topology information.
For instance, nodes on the same "hierarchical level" (i.e. with equally many matching labels) cannot be distinguished in terms of topological closeness.

"Border" problems cause problems for the node name matching principle.
E.g. a node located close to the border of an area represented by a domain name (i.e. a subset sequence of node name labels) may be closer to a node in the neighbouring area than to nodes in the same area (e.g. a node close to the eastern border of "area-west" may have its closest neighbour gateway in "area-east" rather than in "area-west").

The node name matching principle provides only relative information, that is no quantitative information.
As a consequence it is difficult to compare the significance of the topological closeness with other selection criteria when comparing the properties of different SGW/PGW candidates.

The node name matching principle considers only the SGW-PGW part of the complete PDN connection path. No information is provided on the SeGW-SGW part and the PGW-ASBR part.

The Tracking Area structure and the network topology are designed based on different criteria and requirements (e.g. minimizing signalling and interference based on mobility statistics vs. traffic engineering considerations), which makes it difficult (and even potentially impossible) to unambiguously map a TAI to the topologically closest SGW.

Similar issues may arise in existing, 3G UMTS core networks, where the Serving GPRS Support Node, SGSN, acts as a mobility management control entity as well as a user plane node (to be allocated to a connection). The Gateway GPRS Support Node, GGSN, is a further user plane node allocated to a connection by the SGSN acting as mobility management control entity.

A possible solution to this problem is to let the MME retrieve the route metrics for the inter-ON node routes by querying the CN nodes and the transport network routers through their operation and maintenance (O&M) interfaces. This solution is however associated with a number of administrational, practical and technical problems.

SUMMARY

According to a first aspect of the present invention there is provided a method of allocating user plane nodes to a connection being established across a packet core network. The method comprises maintaining at a Domain Name System, DNS, server, one or more DNS resource records for each available user plane node or group of neighbouring user plane nodes, a DNS resource record containing a measure of a route quality or cost between the associated user plane node or group and each of one or more further user plane nodes or further groups of neighbouring user plane nodes of the packet core network to which said associated user plane node or group is connected. A connection establishment request is processed at a mobility management control entity within the packet core network, with a DNS query being sent to a DNS server, the query containing one or more user plane node selection criteria. The query is received at the DNS server and, on the basis of the or each criterion, one or more DNS resource records satisfying the criteria/criterion identified. At least said measure of route quality or cost of the identified DNS resource record(s) is returned to said mobility management control entity. The measure(s) of route quality or cost of the identified DNS resource record(s) are received at the mobility management control entity, and are used to allocate a user plane node or nodes to said connection.

Each DNS resource record may contain, for each said measure, an identity of the corresponding further user plane node or further group of neighbouring user plane nodes.

The packet core network may be a 3GPP Evolved Packet Core network, although the method may also be employed in other network types. In the case of an EPC network however, the mobility management control entity may be a Mobility Management Entity, MME, with said DNS resource records being NAPTR resource records.

The method may be used to allocate one or more of the following user plane nodes to said connection:
  a Serving Gateway;
  a Packet Data Network Gateway; and
  an Autonomous System Border Router.

Each NAPTR resource record is associated with one of the following user plane node types:
  a Security Gateway (SeGW);
  a Serving Gateway (SGW); and
  a Packet Data Network Gateway (PGW).

A given NAPTR resource record may contain measures of the route qualities or costs between the associated user plane node and a node or nodes of a different node type, or between the associated group of neighbouring user plane nodes and a group or groups of neighbouring user plane nodes of a different node type. Furthermore:
  a NAPTR resource record associated with an individual or group of Security Gateways contains measures of the route quality or cost between that Security Gateway or group and one or more Serving Gateways or Serving Gateway groups;
  a NAPTR resource record associated with an individual or group of Serving Gateways contains measures of the route quality or cost between that Serving Gateway or group and one or more Security Gateways and/or one or more Packet Data Network Gateways or groups of Security Gateways and/or Packet Data Network Gateways; and/or
  a NAPTR resource record associated with an individual or group of Packet Data Network Gateway contains measures of the route quality or cost between that Packet Data Network Gateway or group and one or more Serving Gateways or groups of Serving Gateways and/or between that individual or group of Packet Data Network Gateways and one or more individual or groups of Autonomous System Border Routers.

The packet core network may be a 3G UMTS core network, with said mobility management control entity being a Serving GPRS Support Node, SGSN, and said user plane nodes including SGSNs and Gateway GPRS Support Nodes, GGSNs.

The measures contained within a DNS resource record may form part of a domain name or a Fully Qualified Domain Name, FQDN. The FQDN identifies the associated node or group of nodes within the network.

The DNS server may hold, for each of one or more available user plane nodes, two or more DNS resource records so that, upon receipt of said query, the DNS server may return measures of those two or more DNS resource records and, upon receipt of the measures by the mobility management control entity, the entity combines the measures contained in the resource records.

According to a second aspect of the present invention there is provided a method of allocating user plane nodes to a connection being established across a packet core network. The method comprises receiving a connection establishment request and, in response to receipt of the connection establishment request, sending a DNS query to a DNS server, the query containing one or more user plane node selection criteria. The method further comprises receiving a response from the DNS server, a response containing measures of route quality or cost associated with one or more DNS resource records satisfying said criterion or criteria, and allocating a user plane node to the connection being established using one or more received measures of route qualities. Each measure is attributed to a route between an individual or group of user plane nodes associated with the resource record and a further user plane node or further group of user plane nodes to which that associated node or group of nodes is connected.

The method may further comprise carrying out said steps at one of a Mobility Management Entity, MME, of a 3GPP Evolved Packet Core network, and a 3GPP UMTS Serving GPRS Support Node, SGSN.

According to a third aspect of the present invention there is provided apparatus configured to operate as a mobility management control entity within a packet core network. The apparatus comprises a connection establishment handler for processing a connection establishment request, and a user plane network node selector. This selector has a DNS query sending unit responsive to receipt of a connection establishment request for sending a DNS query to a DNS server, the query containing one or more user plane node selection criteria, and a DNS query response receiving unit for receiving a response from the DNS server, a response containing one or more measures of route quality or cost associated with the DNS resource records satisfying said criterion or criteria. The selector further comprises a user plane node allocation unit for allocating a user plane node to the connection being established using one or more received measures of route qualities, wherein each measure is attributed to a route between a user plane node or group of user plane nodes associated with the resource record and a further user plane node or further group of user plane nodes to which that associated node or group of nodes is connected.

According to a fourth aspect of the present invention there is provided apparatus configured to operate as a Domain Name System, DNS, server within a packet core network comprising a plurality of user plane nodes. The apparatus comprises a memory storing one or more DNS resource records for each available user plane node or for each available group of user plane nodes, a DNS resource record containing a measure of a route quality or cost between the associated user plane node or group and each of one or more further user plane nodes or groups of nodes of the packet core network to which said associated user plane node or group is connected. The apparatus further comprises a DNS query receiving unit for receiving from a mobility management control entity a DNS query, the query containing one or more user plane node selection criteria, a DNS resource record identifier unit for identifying one or more DNS resource records satisfying the criteria/criterion, and a DNS query response unit for returning the or each measure of route quality or cost of the identified DNS resource record(s) to said mobility management control entity.

Embodiments of the invention presented here may provide accurate, fine-granular and relevant route/path property information, thereby enabling equally accurate, fine-granular and relevant path evaluations. Border problems, like those encounter at the border of administrative (domain name) regions in 3GPP networks can be alleviated or even eliminated. Nodes which are equivalent in terms of path suitability are identified as equivalent only if they really are, as opposed to the existing 3GPP solution where nodes with the same number of matching node name labels cannot be differentiated in terms of path suitability.

The provided metrics are based purely on properties of the routes, so that pure path optimization/suitability evaluations are enabled. This is in contrast to the existing 3GPP method of selecting a SGW, where the path related input data is the current TAI. This use of the TAI is a suboptimal surrogate for real path/topology data since the Tracking Area structure is derived from criteria other than the network topology, which implies that mismatches therebetween may be frequent.

The EPS solutions proposed take all nodes and routes into account which are relevant for the evaluation of the full user plane path, including SeGWs, SGWs, PGWs and ASBRs and the routes between them. This enables a true evaluation of the impact of the SGW/PGW candidates on the user plane path. This is in contrast to the existing 3GPP method of node name label matching, which only considers the relative closeness of SGWs and PGWs.

The proposed solutions can be made backwards compatible in order to handle mixed networks comprising solution-aware and legacy MMEs.

Further aspects of the present invention are defined in the appended claims.

BRIEF DESCRIPTION OF THE DRAWINGS

FIG. 2 illustrates an example S-NAPTR DNS resource record;

DETAILED DESCRIPTION

There is presented here an improved SGW/PGW selection mechanism which leverages the prior art DNS-based mechanisms, and extends them by encoding properties of a path (across the EPC network including a node or nodes in question) into FQDNs. The transport network topology and other relevant route properties are hidden and abstracted into a single metric, which is associated with a route between two relevant nodes. The relevant nodes include SeGWs, SGWs, PGWs and ASBRs. A metric is associated with each possible route that may be part of a full SeGW-ASBR path, including SeGW-SGW routes, SGW-PGW routes and PGW-ASBR routes (disregarding the UE-eNB-SeGW part of the path, since this is not affected by the SGW/PGW selection).

Figure 4:
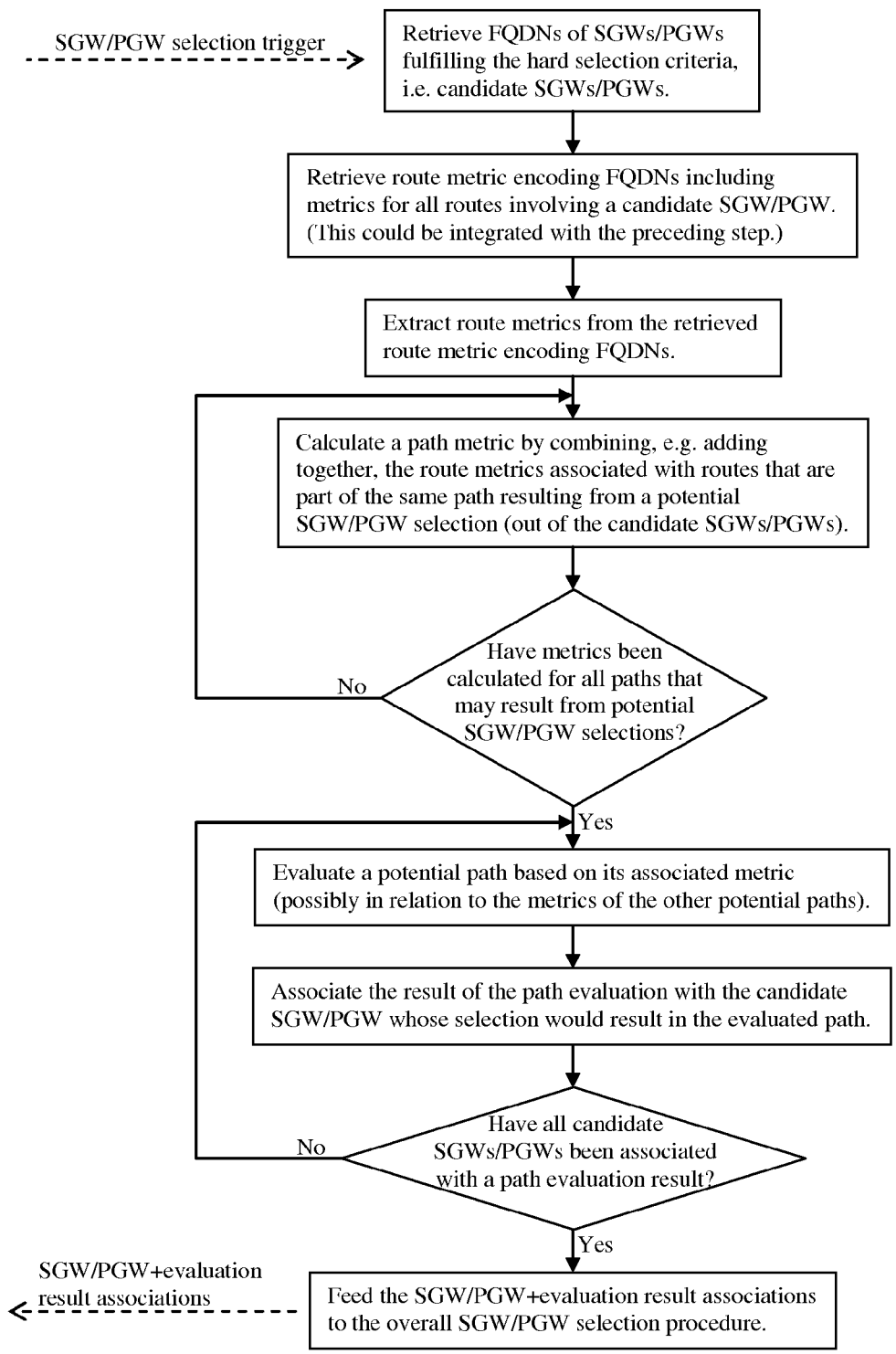
FIG. 4 is a flow diagram showing in detail a procedure for allocating nodes to a connection being established across an EPC.

A common property of the approaches described here is that the route metrics of a route between two nodes are encoded in, and may be extracted from, a single FQDN associated with one of the two nodes. The MME utilizing the encoded FQDNs in its SGW/PGW selection procedure must be enhanced with special logic in order to retrieve and properly utilize the route metrics to evaluate candidate SGWs/PGWs from a path optimization/property perspective. The procedure executed by an MME varies for different selection cases, but the general procedure is illustrated on an overview level by the flow chart of FIG. 4.

Of the full UE-ASBR path, the UE-eNB-SeGW part is fixed as a consequence of the eNB selection. When encoding path properties to enable comparison of the paths that result from selection of different candidate SGWs/PGWs, the UE-eNB-SeGW part may therefore be disregarded, as it is independent of the choice of SGW/PGW and thus the same for all candidate SGWs/PGWs. Hence, the part of the UE-ASBR path that is of interest consists of three route categories: the SeGW-SGW path, the SGW-PGW path and the PGW-ASBR path. These routes are the subject of the special FQDN encoding.

As already noted, when encoding route properties into an FQDN, the transport network topology of the route is hidden and abstracted into a single metric. This could be the metric used by the routing protocol in the network (e.g. OSPF and/or IBGP), a metric derived from traffic engineering requirements, a bandwidth related metric, a delay related metric, a packet loss probability metric, a transmission cost related metric or any other metric that an operator finds useful.

Two alternative encoding principles are elaborated here:

Method 1: Encode multiple route metrics (each representing a route between two interconnectable 3GPP nodes) in a single FQDN.

Example: the FQDN of a SeGW encodes the route metrics towards each connectable SGW.

Method 2: Configure multiple FQDNs for each node, each encoding a single route metric (representing the route to a single other node).

Example: a certain SGW has one FQDN encoding the metric of the route to SeGW1, one FQDN encoding the metric of the route to SeGW2, etc.

A common property of the two methods is that the route metrics of a route between two nodes are encoded in, and may be extracted from, a single FQDN associated with one of the two nodes.

If a node is multi-homed with interfaces on different networks, each interface may be considered separately and will have one or more associated route metric encoding FQDNs.

Since the structure of the final output FQDNs are standardized, the approach here is to encode the route metrics in intermediate FQDNs, which are non-standardized and free to use in any suitable fashion. This makes the solutions backwards compatible with MMEs that do not support the new schemes. However, if a suitable one of the methods to deal with legacy MMEs (see below) is used, then non-standardized formats may be used for either initial (input) FQDNs or final (output) FQDNs or both, i.e. the route metrics may be encoded in the final (output) FQDNs. It should also be pointed out that as long as a route metric encoding FQDN can be resolved by the DNS (ultimately to an IP address), it may be used also as a final (output) FQDN, even towards legacy MMEs. A disadvantage is of course that this approach prevents legacy (non-metric-encoding-aware) MMEs from identifying combined SGWs/PGWs based on node name label matching.

Method 1

Considering further method 1 outlined above, in this method an FQDN associated with a node of a certain type may encode metrics for the routes to all nodes of a certain other type. [It may also be possible to encode metrics for routes to two other types of nodes in the same FQDN.]

When considering the routes between type X nodes and type Y nodes, there is a design choice as to whether to encode the metrics for the interconnecting routes in FQDNs associated with type X or type Y nodes or both. There are different aspects to consider for different types of nodes. In general it is preferable to have the route metrics encoded in the type of node that is fixed in a certain selection case, which means that different choices may be preferable for different selection cases. These choices and some consequences thereof are elaborated as follows:

SeGW-SGW Routes

Since the SeGW is fixed in all selection cases, it is preferable to encode the metrics of SeGW-SGW routes in SeGW FQDNs.

SGW-PGW Routes

The metrics of SGW-PGW routes may be encoded in SGW FQDNs, PGW FQDNs or both. Using SGW FQDNs is good for PGW selections, e.g. during the 'additional PDN connection' selection case, but it is suboptimal for SGW selection, e.g. during the 'SGW relocation' selection case. The opposite applies if the route metrics are encoded in PGW FQDNs. Hence, depending on which selection case is assumed to be the most common (which partly depends on operator policies and network deployment choices), either one may be preferable, but to provide optimal support for all selection cases, the route metrics should be encoded in both SGW FQDNs and PGW FQDNs (i.e. in principle encoding redundant information to improve performance).

PGW-ASBR Routes

The metrics of a PGW-ASBR route is a property that follows with the selection of the PGW, i.e. the ASBR in itself is not explicitly selected (even though it is not fixed), but is rather a "by-product" of the PGW selection. Therefore, the metrics of the PGW-ASBR routes are preferably encoded in PGW FQDNs. Furthermore, as the ASBRs can be considered equivalent in this context, the metric of only a single PGW-ASBR route need be encoded in the FQDN of each PGW. The encoded route metric may represent the properties of:

the route to the "best" ASBR (where "best" implies the best from any desirable aspect, e.g. in terms of number of hops, available bandwidth, most beneficial peering agreement, some traffic engineering purpose, etc.); or a weighted (according to assumed traffic distribution) average of the routes to all ASBRs available to the PGW.

Various ways of encoding route metrics in FQDN labels are conceivable. The requirement is that an MME receiving the FQDN can derive both the endpoints and a relevant metric of each route. The MME must of course also be able to interpret the metrics, so that meaningful comparisons can be performed between metrics of different routes. Two encoding examples are as follows FQDN example 1:

--- metric-<route metric>.<remote endpoint node ID>.route-metric.metric-<route metric>.<remote endpoint node ID>.route-metric.<interface label>.<node name labels>.

---

Reading the FQDN of this example from right to left the appearance of a "route-metric" label indicates that the labels to the left of this label encode the metric of a route as well as the endpoint of the route. The "<remote endpoint node ID>" following to the left of the "route-metric" label represents an identifier associated with the endpoint node of the concerned route. This identifier could be an IP address, e.g. encoded in a single label using hexadecimal digits preceded by the qualifier "IP-". Another possible identifier is the node name+interface label, consisting of the (usually multiple) labels of the node name followed (to the left) by the interface label.

The scope of the route information is a single operator network and hence the operator domain part of the node names (typically "epc.mnc<MNC>.mcc<MCC>.3gppnetwork.org") may be omitted when the node name is included in the FQDN as a remote endpoint node ID. The appearance of a label beginning with "metric-" indicates that the preceding (to the right) label was the last label of the remote endpoint node ID and that the remaining part of the label (i.e. the part of the label to the right of "metric-") constitutes a route metric. This "metric-" indication could also be omitted, in which case the appearance of another "route-metric" label (or the left end of the FQDN) would indicate that the preceding (to the right) label contains a route metric. The route metric would preferably be expressed as a number, e.g. a decimal or hexadecimal number, encoded with alphanumerical characters.

FQDN example 2:

```
metric-<route  metric>.[metric-type-<route  metric  type>.]<remote
endpoint node   ID>.route-metric.metric-<route   metric>.[metric-type-
<route  metric type>.]<remote endpoint node ID>.route-metric.<interface
label>.<node name labels>.
```

This example extends the first example with an optional (where "Li" indicates optional) metric type indicator, which is "squeezed" in between the remote endpoint node ID labels and the metric label. Hence, in this example, the appearance of a label beginning with either "metric-" or "metric-type-" indicates that the remote endpoint node ID labels have ended. The actual encoding of the type of route metric (indicated by <route metric type>) could for example be a number (i.e. one of a predefined set of numbers representing a predefined corresponding set of metric types). In the absence of a metric type label, the MME would assume a default route metric type.

The MME retrieves the route metric information encoded in FQDNs from the DNS server(s) (typically in the replacement field of a NAPTR RR). The route metric information may be included in the returned FQDN unsolicited or on explicit request. In the latter case a query without an explicit request for route metric information (e.g. in the form of a special prefix label, e.g. "metric-request", added to the query FQDN) would trigger a regular FQDN to be returned. [The further description given below of method 2, elaborates methods upon the explicit request for route metric encoding FQDNs, relevant parts of which may be reused in method 1.)

A general note applicable to the procedures below is that, when retrieving FQDNs for all SGWs or PGWs that support certain hard selection criteria (e.g. APN support, Tracking Area/service area support, mobility protocol support, etc.), the application of multiple hard selection criteria to the same GW type may cause the procedure to be broken up in several sequential DNS queries, since each hard selection criterion (depending on how it is encoded) may require its own query in the S-NAPTR procedure.

Another general note is that the procedure descriptions below describe the "minimum" procedures. An operator may choose to configure the DNS such that one or more NATPR query-response rounds are performed in addition to the ones described in a "minimum" procedure.

Procedure for the Attach Selection Case

The following procedure supports selection of SGW and PGW during Attach.

1. The MME retrieves FQDNs for all SGWs and PGWs that fulfil the hard selection criteria (e.g. APN support, Tracking Area/service area support, mobility protocol support, etc.).

These FQDNs, either the SGW FQDNs or the PGW FQDNs or both, contain the metrics of all potential SGW-PGW routes. Assuming that (in most or all scenarios) all SGWs/PGWs are combined nodes, from a path optimization perspective it is obvious that a combined SGW/PGW will be the best choice. However, selection of a combined SGW/PGW node may be prevented in rare cases, where there is no combined node where both the SGW and the PGW fulfil their respective hard selection criteria.

The PGW FQDNs contain metrics for the respective PGW's route to an ASBR.

2. The MME identifies the SeGW (elaborated further below).

3. The MME sends a DNS query including an identifier (e.g. in the form of node name labels) associated with the identified SeGW and retrieves an FQDN encoding the metrics of the routes from the SeGW to all potential SGWs.

4. The MME now has metrics for all the routes for all possible selections of SGW and PGW and can thus evaluate the options from a path optimization/suitability perspective.

Procedure for the SGW Relocation Selection Case

The following procedure supports selection of SGW during SGW relocation.

1. The MME retrieves FQDNs for all SGWs that fulfil the hard selection criteria (e.g. Tracking Area/service area support, mobility protocol support, etc.).

As mentioned above, it is a design choice as to whether to encode the metrics of SGW-PGW routes in SGW FQDNs, PGW FQDNs or both. Hence, the retrieved FQDNs may or may not contain the metrics of the routes to all PGWs, including the current (fixed) PGW(s).

2. If the FQDNs retrieved in step 1 do not include metrics for the SGW-PGW routes, the MME may retrieve an FQDN of each current (fixed) PGW(s), encoding the metrics of the routes to all SGWs, depending on the circumstances of the SGW relocation (mainly on whether it involves relocation of the serving MME).

If an MME relocation is not performed (which is probably true in many cases, e.g. if SGW service areas are coordinated with MME pool areas), the MME already has the PGW FQDN(s) and does not have to request it(them).

If an MME relocation (i.e. MME pool change) is performed, the new MME receives the FQDN(s) of the current PGW(s) from the previous MME and, if route metrics are encoded in this(these) FQDN(s), then the MME will have the relevant PGW FQDN(s) even for SGW relocation selection cases involving MME pool changes. Otherwise, the same result could be achieved by a new mechanism utilizing the private extension IE (or a new IE) in a GTP-C message to transfer the route metric encoding PGW FQDN(s) from the previous to the new MME.

3. The MME identifies the SeGW (elaborated below).

4. The MME sends a DNS query and retrieves an FQDN encoding the metrics of the routes from the SeGW to all potential SGWs.

5. The MME now has metrics for all the routes for all possible SGW selections and can thus evaluate the options from a path optimization/suitability perspective.

Procedure for the Additional PDN Connection Selection Case

The following procedure supports selection of PGW during establishment of an additional PDN connection.

1. The MME retrieves FQDNs for all PGWs that fulfil the hard selection criteria (e.g. APN support, mobility protocol support, etc.).

These FQDNs contain metrics for the respective PGW's route to an ASBR.

These FQDNs may or may not contain the metrics of the routes to all SGWs, including the current (fixed) SGW.

2. The MME already has the route metric encoding FQDN of the current (fixed) SGW (retrieved during the previous SGW selection), so it does not have to retrieve it again, even if the PGW FQDNs retrieved in step 1 do not contain any metrics for SGW-PGW routes.

3. The MME now has metrics for all the relevant routes for all possible PGW selections and can thus evaluate the selections from a path optimization/suitability perspective.

To identify the SeGW in the path, the MME leverages the IP address of the eNB that the UE is using. This IP address is available in the SCTP socket associated with the S1-MME interface towards the concerned eNB (through which interface NAS signalling between the UE and the MME and S1AP signalling (concerning the UE) between the eNB and the MME take place). Furthermore, the DNS server(s) is(are) configured with FQDNs associated with the SeGWs, wherein each FQDN includes an indication of the IP address range allocated to the SeGW (out of which address range the addresses of the eNBs connected to the SeGW are allocated). Then the MME is configured with a generic SeGW FQDN which, when included in a DNS query, triggers the DNS server(s) to return the address range encoding FQDNs of all SeGWs in the network.

An alternative to the generic SeGW FQDN in the query could be to use a service query (i.e. SRV type DNS query) with SeGW indicated as the requested service. To support this a new symbolic name representing the SeGW as a service in DNS SRV RRs would have to be defined, e.g. "_segw". The MME could then retrieve an SRV RR including the IP range encoding FQDNs by sending a DNS query with the QTYPE set to "SRV" and the QNAME set to "_segw._ipv4.eps.mnc<MNC>.mcc<MCC>.3gppnetwork.org" or "_segw._ipv6.eps.mnc<MNC>.mcc<MCC>.3gppnetwork.org".

See A. Gulbrandsen et al., "A DNS RR for specifying the location of services (DNS SRV)", RFC 2782, February 2000, for a definition of SRV RRs and related procedures.

An alternative to retrieving the SeGW IP address ranges via DNS could be to configure them directly in the MMEs.

When the MME knows the IP address ranges of the SeGWs, it matches the eNB IP address with the address ranges. The SeGW in the path is the SeGW associated with the matching address range. As installation and removal of SeGWs, as well as changes in SeGW IP address ranges, are expected to be rare events, the MME may potentially store and rely on the retrieved SeGW IP address range information for a relatively long time without having to confirm it via new DNS requests.

As described above, the MME retrieves the eNB IP address from the control plane interface towards the eNB (i.e. S1-MME). Hence, if different IP address ranges are used for different purposes, e.g. CP, UP and O&M, it is the CP IP address range that is to be configured (in the DNS server(s) or the MMEs). A possible alternative to using the eNB CP address is to configure/retrieve the UP address range and use the IP address of the first eNB DL F-TEID (which includes the eNB user plane (S1-U) IP address) that is signalled over a newly established S1-MME interface to associate the eNB/S1-MME interface with a certain SeGW.

As this method encodes metrics of multiple routes in a single FQDN, there is a risk that an FQDN grows excessively long, potentially longer than the maximum allowed length of 253 octets. The following mechanisms may be used to counteract this potential problem:

1. Choose not to Include the Metrics of Some Routes

A potentially excessively long FQDN can be shortened by simply excluding the metrics of some routes. Routes whose metrics will be excluded may be chosen using one of the following approaches:

Encode only metrics of routes whose metrics are <X.

Encode metrics of maximum Y number of routes (the "best" ones, i.e. the ones with the smallest metrics) in an FQDN.

Restrict the size of an FQDN to maximum Z bytes by truncating the FQDN (to the left) between two route metric encodings.

Before performing the truncation the route metrics should be ordered from smallest to greatest (i.e. from "best" to "worst"), so that the route metrics to be excluded are the worst.

This last approach can be seen as a flexible variant of either of the two first approaches with the limit (applied in terms of metrics or number of routes) dynamically adapted on a case by case basis, so that the metrics of as few routes as possible are excluded.

Irrespective of which approach is used, the MME should consider a route whose metric is absent, as long/poor/unfavourable and should assign a default metric to it. This metric should be worse than any of the metrics included in the retrieved FQDN. Hence, assuming that greater metrics are worse than lower metrics, the default metric rule could be that $M_{default}=MAX(M_{high}, MAX(metrics\ in\ FQDN)+\delta)$, where $M_{high}$ is a comparatively high metric and $\delta$ is a fraction of an approximately average metric.

2. Differentiate Route Metric Encoding Based on Hard Selection Criteria

A way to shrink FQDN sizes by distributing the encoded route metrics on different FQDNs is to distinguish sets of routes leading to GWs supporting different hard selection criteria. This requires that the hard selection criterion be encoded in the DNS query retrieving the route metric encoding FQDN. For example, when requesting PGW FQDNs encoding metrics of routes to SGWs, the TAI of the UE's current Tracking Area is encoded in the query. The returned FQDNs should then only include metrics of routes leading to SGWs supporting the indicated SGW Tracking Area.

3. Distribute Sets of Route Metrics to Multiple FQDNs

By configuring multiple FQDNs eventually leading to the same node (and interface), it is possible to distribute the route metrics to be encoded to different FQDNs, wherein each FQDN would comprise a subset of the relevant route metrics, so that none of the FQDNs exceeds the specified maximum size. All the FQDNs would be configured to end with the same interface and node name labels, so that it is obvious to the MME that the encoded route metrics in the different received FQDNs should complement each other and pertain to the same node. Such multiple FQDNs can be configured in multiple NAPTR RRs with or without utilizing the canonical name (CNAME) feature of DNS.

Looking first at a solution where no CNAME RRs are used, assume that a gateway, GW1 (or actually a certain interface of GW1), has its relevant route metrics encoded in two different FQDNs, denoted FQDN-A and FQDN-B, both ending with the same interface and node name labels associated with GW1. Each of these FQDNs is included in the replacement field of a NAPTR RR, all matching the same NAPTR query. Hence, a NAPTR query which concerns GW1 (e.g. a TAI query with a TAI which GW1 serves or an APN query with an APN which GW1 supports or some other query for which GW1 is a candidate) would match (at least) two NAPTR RRs (if multiple nodes match the initial query, the operator may choose to configure the DNS such that one or more additional NAPTR query-response rounds are performed after the initial query and before the query response rounds performed in this example): one where the replacement field is FQDN-A and one where the replacement field is FQDN-B, both having the same ORDER and PREFERENCE attributes. Both would have a non-terminal flag (i.e. the empty flag, " ", in a S-NAPTR procedure).

The common interface and node name labels of the two FQDNs indicate to the MME that they contain complementary route metrics and that they are associated with the same node (and interface). Hence the MME concludes that it need only proceed the S-NAPTR procedure for one of the two FQDNs. Irrespective of which of FQDN-A and FQDN-B the MME chooses to include in its subsequent NAPTR query, the DNS will return the same NAPTR RR containing FQDN-C in the replacement field and the flag set to a terminal value (i.e. "a" or "s"). The MME would then use FQDN-C in either an address (A/AAAA) query (if the flag is set to "a") or a service (SRV) query (if the flag is set to "s") to eventually resolve the IP address of (the concerned interface of) GW1.

Extending this example with CNAME RRs, the two FQDNs, FQDN-A and FQDN-B, would be configured as aliases of the same canonical name FQDN, e.g. FQDN-C, associated with (the concerned interface of) GW1. This way one would save the above query returning FQDN-C. Instead, the two NAPTR RRs returning respectively FQDN-A and FQDN-B would have their flag set to the terminal value "a", indicating that the FQDN in the replacement field should be used in an address (A/AAAA) query. Since both FQDN-A and FQDN-B are configured as aliases for FQDN-C, it does not matter which of the two FQDNs the MME chooses to use in the subsequent address query. In either case the DNS resolver will encounter the CNAME RR containing FQDN-C and (since the query was an A/AAAA query and not a CNAME or wild card (*) query) will then restart the resolution with FQDN-C to eventually find a matching A/AAAA RR, containing the IP address of (the concerned interface of) GW1, which is returned to the MME. The same result may be achieved by simply configuring multiple FQDNs to point at the same node interface (with the flag set to "a" in the NAPTR RRs returning them) without using the CNAME feature, but this will cause problems if pointer (PTR) queries (i.e. IP address-to-FQDN translation) are to be used.

Using multiple FQDNs in these ways may allow an arbitrary number of FQNDs associated with the same node and interface to be configured, thus allowing the route metrics of an arbitrary number of routes to be encoded.

4. Use Short Aliases for Remote Endpoint Node IDs

The Remote Endpoint Node IDs may constitute a large part of a route metric encoding FQDN, e.g. if node name labels are used as remote endpoint node IDs. By replacing the remote endpoint node IDs with short aliases, the resulting FQDN sizes may be significantly reduced.

Alias-to-remote endpoint node ID translation tables could be configured in the MMEs or translating RRs, e.g. CNAME RRs, could be configured in the DNS server(s) so that the MMEs can create and maintain their own translation tables. To translate an alias into a remote endpoint node ID in the latter case, an MME would send a DNS query including the alias in the FQDN and get an FQDN encoding the remote endpoint node ID in response. The FQDN including an alias could, for example, have the format:
<alias>.alias-translation.eps.mnc<MNC>.mcc<MCC>.3gppnetwork.org.

Possibly multiple aliases to be translated could be included in the same FQDN, e.g. using the format:
alias-<alias>[ . . . alias-<alias>].alias-translation eps.mnc<MNC>.mcc<MCC>.3gppnetwork.org,
but that would probably require novel functionality in the DNS server(s).

The aliases could be number based, e.g.:

| "SGW-1" | → | "eth1.gw11.west.nodes" |
| "SGW-2" | → | "eth1.gw8.east.nodes" |
| "PGW-1" | → | "eth2.gw11.west.nodes" | or even shorter:

| "1" | → | "eth1.gw11.west.nodes" |
| "2" | → | "eth1.gw8.east.nodes" |
| "3" | → | "eth2.gw11.west.nodes" |

For a DNS based translation of the alias "3", an MME would send a DNS query with an FQDN including "3", e.g. "3.alias-translation.eps.mnc<MNC>.mcc<MCC>.3gppnetwork.org.

The DNS server could then return a CNAME RR including "eth2.gw11.west.nodes.eps.mnc<MNC>.mcc<MCC>.3gppnetwork.org.

This method may be used together with any of the above described FQDN size reduction methods.

5. Selecting Routes to Encode Based on Node Name Label Matching

A way to selectively encode only a limited number of routes in FQDNs is to utilize the standardized node name label matching principle and choose to encode only routes between nodes which either share a certain minimum number of labels or differ in a certain maximum number of labels.

6. Encoding Metrics of Inter-Site Routes Instead of Inter-Node Routes

A possible way to condense the route metric encoding data, and thus shorten the FQDN lengths, is to leverage the fact that core network nodes, in particular SGWs and PGWs, are typically deployed in groups at different sites. The routes between any node located at a certain site and any other node located at a certain other site, e.g. the routes between the nodes on site A and the nodes on site B, are equal and hence have the same route metric. Hence, encoding route metrics for the same inter-site route more than once is in principle redundant (even if the specific endpoint nodes at the sites differ). A more compact encoding recognizes the site location and encodes metrics of only one route between any given pair of sites. Further details are provided below.

Method 2

According to this second method, an FQDN encodes the route metric of only one route (excluding metrics of the PGW-ASBR routes). This means that multiple FQDNs will be associated with a single node (or even a single node interface). For instance, if there are two SGWs (SGW1 and SGW2) and two PGWs (PGW1 and PGW2) in a network, and metrics of SGW-PGW routes are encoded in SGW FQDNs, then each SGW will have two route metric encoding FQDNs associated with it. SGW1 will be associated with one FQDN encoding the metric of the SGW1-PGW1 route and one FQDN encoding the metric of the SGW1-PGW2 route. Similarly, SGW2 will be associated with one FQDN encoding the metric of the SGW2-PGW1 route and one FQDN encoding the metric of the SGW2-PGW2 route.

Multiple FQDNs associated with the same node (interface) may be configured in the replacement fields of NAPTR RRs, which would be returned to a querying client, and they may or may not also be configured in CNAME RRs as aliases associated with a canonical name FQDN. Hence, an MME may request the metric of a certain route through a NAPTR query with a special FQDN including identifiers of both endpoint nodes, one of them indicated in the regular node name labels and the other appended as a prefix. The DNS server would return a NAPTR RR including an FQDN (in the "replacement" field) which includes the metric of the concerned route.

Alternatively the MME may send a NAPTR query with a special FQDN indicating a request for metrics for all routes from a certain node to a certain other type of node (i.e. the metrics of the routes from the concerned node to all nodes of the indicated other type) and the response would include multiple RRs, each containing an FQDN encoding the metric of a route from the concerned node to one of the nodes of the indicated other type.

Yet another alternative is for the MME to send a NAPTR query with a special FQDN indicating a request for metrics for all routes from a certain node to all other relevant nodes irrespective of type (e.g. routes to SeGWs and PGWs from a certain SGW or routes to SGWs and an ASBR from a certain PGW). Since different FQDNs would be used in the query in all these alternatives (i.e. requesting metric(s) for a single route, multiple routes to nodes of a certain type, or multiple routes to two node types), all three alternatives could be implemented/used in parallel. Note also that for the case of request for metrics of all routes from a certain node, there is, as with method 1, an option to return these route metrics unsolicited, i.e. without a preceding explicit request.

The type of request indicating a specific route is hereinafter referred to as a "route specific request" or the "route specific request type". The other two alternatives are referred to as "generic request types". To distinguish between the two generic request types, i.e. indicating node type in the request or not, the terms "partially generic request" is used for the former and "fully generic request" is used for the latter. The option of unsolicited inclusion of route metrics in a response is referred to as "implicit request".

As for method 1, one has to choose whether metrics of routes between nodes of types X and Y should be encoded in FQDNs associated with nodes of type X or nodes of type Y. If metrics of only a single route are returned in response to a query (i.e. if the more generic types of request for metrics of multiple routes from a certain node are not used), then, in contrast to the case of method 1, it does not matter which FQDNs the route metrics are encoded in. However, if either of the two more generic request types is used, for which metrics of multiple routes from a certain node are returned in response, then the same general preference as in method 1 is valid, i.e. that it is beneficial to have the route metrics encoded in the type of node that is fixed in a certain selection case, which means that different choices may be preferable for different selection cases.

SeGW-SGW Routes

If generic request types are used, it is preferable to encode the metrics of SeGW-SGW routes in SeGW FQDNs, since the SeGW is fixed in all selection cases. If only the route specific request type (i.e. requesting metrics for a specific route and receiving a single RR containing a single FQDN encoding the metric of this specific route in response) is used, either SeGW FQDNs or SGW FQDNs could be used to encode the route metrics.

SGW-PGW Routes

The metrics of SGW-PGW routes may be encoded in SGW FQDNs, PGW FQDNs or both. If generic request types are used, then the route metrics could be encoded in SGW FQDNs (good for the PGW selection case), PGW FQDNs (good for the SGW relocation selection case) or both (redundant information will be configured but good for both selection cases).

PGW-ASBR Routes

Since only a single PGW-ASBR route metric is encoded in both method 1 and method 2, this is handled in the same way as for method 1.

Various ways of encoding route metrics in FQDN labels are conceivable. The requirement is that an MME receiving the FQDN can derive both the endpoints and a relevant metric of each route. The MME must of course also be able to interpret the metrics, so that meaningful comparisons can be performed between metrics of different routes. The encoding of a single route metric in an FQDN depends on whether route specific requests or generic requests (or the optional implicit request type) are used.

Route Specific Requests, No Implicit Requests

FQDN examples:

<route metric>.<interface label>.<node name labels>.
<route metric>.[metric-type-<route metric type>.]<interface label>.<node name labels>.

Since the requesting MME knows that a route metric will be returned as well as the identity of the remote endpoint node, neither an explicit indication of route metric related labels have to be included, nor a remote endpoint node ID. It is also possible to let the DNS query include an indication of the type of metric requested, in which case the (optional) metric type indication in the second of the FQDN examples above is redundant.

Generic Requests, No Implicit Requests

FQDN examples:

<route metric>.<remote endpoint node ID>.<interface label>.<node name labels>.
<route metric>.[metric-type-<route metric type>.]<remote endpoint node ID>.<interface label>.<node name labels>.

As above, if the DNS query includes an indication of the type of metric requested, the (optional) metric type indication in the second of the FQDN examples above is redundant.

Implicit Requests (i.e. Equivalent to Using Only Fully Generic Requests)

FQDN example:

metric-<route metric>.<remote endpoint node ID>.route-metric.<interface label>.<node name labels>.
metric-<route metric>.[metric-type-<route metric type>.]<remote endpoint node ID>.route-metric.<interface label>.<node name labels>.
In this case the presence of the route metrics should be "announced" by the "route-metric" label.

It is also of interest to consider the format of the special request/query FQDNs to be used respectively for route specific requests, partially generic requests and fully generic requests. In order not to violate the specified format of the FQDN of the initial DNS query of the S-NAPTR procedure, the special query FQDN should be included in one of the intermediate DNS queries. However, since both the MMEs and the DNS server(s) are under the control of the same operator, there is no real obstacle to supporting a non-standard format of the FQDN in the initial DNS query too. This is just a matter of configuring response RRs for these FQDNs too in the DNS server. Such non-standard initial FQDNs would combine a method specific indicator with APN labels or TAC labels in the same FQDN.

Route Specific Request

The FQDN must include identifiers of the endpoint nodes of the route. It is convenient to associate the FQDN with one of the endpoint nodes and this endpoint node would thus be encoded as the regular node name labels. The other endpoint node could be encoded in the same manner as the "remote endpoint node ID" in method 1 above. The FQDN should also include an explicit indication of the type of request.

FQDN examples (intermediate query):

```
<remote endpoint node ID>.route-specific-request.<interface label>.<node name labels>.
<remote endpoint node ID>.[metric-type-<route metric type>.]route-specific-request.<interface label>.<node name labels>.
```

The "route-specific-request" label indicates the "border" between the interface+node name labels and the remote endpoint node ID. If, in the second example, the optional metric type indicator is not included, then a default route metric type should be returned.

FQDN examples (initial query):

```
<remote endpoint node ID>.route-specific-request.<APN labels>.apn.<interface label>.<node name labels>.
<remote endpoint node ID>.[metric-type-<route metric type>.]route-specific-request.<APN labels>.apn.<interface label>.<node name labels>.
<APN labels>.apn.<remote endpoint node ID>.route-specific-request.<interface label>.<node name labels>.
<APN labels>.apn.[metric-type-<route metric type>.]<remote endpoint node ID>.route-specific-request.<interface label>.<node name labels>.
<remote endpoint node ID>.route-specific-request.tac-lb<TAC low byte>.tac-hb<TAC high byte>.tac.<interface label>.<node name labels>.
<remote endpoint node ID>.[metric-type-<route metric type>.]route-specific-request.tac-lb<TAC low byte>.tac-hb<TAC high byte>.tac.<interface label>.<node name labels>.
tac-lb<TAC low byte>.tac-hb<TAC high byte>.tac.<remote endpoint node ID>.route-specific-request.<interface label>.<node name labels>.
tac-lb<TAC low byte>.tac-hb<TAC high byte>.tac.[metric-type-<route metric type>.]<remote endpoint node ID>.route-specific-request.<interface label>.<node name labels>.
```

In the examples above the added labels are placed either to the left in the FQDN or in between the interface label and the APN or TAC labels. The choice of placement is non-critical (and non-significant), since all the involved labels are readily identifiable in all cases.

Partially Generic Request

The FQDN must include an identifier of the node which is the origin of the concerned routes, i.e. the routes whose metrics are requested. This is most naturally encoded as regular node name labels. In addition, the FQDN must include an indication of the type of node the concerned routes should lead to. The FQDN should also include an explicit indicator of the type of request.

FQDN examples (intermediate query):

```
<remote endpoint node type>.partially-generic-request.<interface label>.<node name labels>.
[metric-type-<route metric type>.]<remote endpoint node type>.partially-generic-request.<interface label>.<node name labels>.
partially-generic-request-<remote endpoint node type>.<interface label>.<node name labels>.
[metric-type-<route metric type>.]partially-generic-request-<remote endpoint node type>.<interface label>.<node name labels>.
```

In an instantiation of this FQDN format "<remote endpoint node type>" is substituted by a label indicating the type of the remote endpoint node, e.g.:

"segw" for SGW-SeGW routes with the origin node being a SGW,
"pgw" for SGW-PGW routes with the origin node being a SGW,
"sgw" for PGW-SGW routes with the origin node being a PGW,
"asbr" for PGW-ASBR routes with the origin node being a PGW (but the metric for the PGW-ASBR route could optionally be included in all route metric encoding PGW FQDNs, e.g. PGW FQDNs encoding metrics of PGW-SGW routes, so that explicit requests for PGW-ASBR route metrics are eliminated).

The "partially-generic-request" label indicates the "border" between the interface+node name labels and the remote endpoint node type label.

FQDN examples (initial query):

```
<remote endpoint node type>.partially-generic-request.<APN labels>.apn.<interface label>.<node name labels>.
[metric-type-<route metric type>.]<remote endpoint node type>.partially-generic-request.<APN labels>.apn.<interface label>.<node name labels>.
<APN labels>.apn.<remote endpoint node type>.partially-generic-request.<interface label>.<node name labels>.
<APN labels>.apn.[metric-type-<route metric type>.]<remote endpoint node type>.partially-generic-request.<interface label>.<node name labels>.
<remote endpoint node type>.partially-generic-request.tac-lb<TAC low byte>.tac-hb<TAC high byte>.tac.<interface label>.<node name labels>.
[metric-type-<route metric type>.]<remote endpoint node type>.partially-generic-request.tac-lb<TAC low byte>.tac-hb<TAC high byte>.tac.<interface label>.<node name labels>.
tac-lb<TAC low byte>.tac-hb<TAC high byte>.tac.<remote endpoint node type>.partially-generic-request.<interface label>.<node name labels>.
tac-lb<TAC low byte>.tac-hb<TAC high byte>.tac.[metric-type-<route metric type>.]<remote endpoint node type>.partially-generic-request.<interface label>.<node name labels>.
```

Fully Generic Request

The FQDN must include an identifier of the node which is the origin of the concerned routes, i.e. the routes whose metrics are requested. This is most naturally encoded as regular node name labels. The FQDN should also include an explicit indicator of the type of request.

FQDN examples (intermediate query):

```
fully-generic-request.<interface label>.<node name labels>.
[metric-type-<route metric type>.]fully-generic-request.<interface label>.<node name labels>.
```

In this case the "fully-generic-request" label distinguishes the FQDN from a regular query FQDN for the origin node.

FQDN examples (initial query):

```
fully-generic-request.<APN labels>.apn.<interface label>.<node name labels>.
[metric-type-<route metric type>.]fully-generic-request<APN labels>.apn.<interface label>.<node name labels>.
fully-generic-request.tac-lb<TAC low byte>.tac-hb<TAC high byte>.tac.<interface label>.<node name labels>.
[metric-type-<route metric type>.]fully-generic-request.tac-lb<TAC low byte>.tac-hb<TAC high byte>.tac.<interface label>.<node name labels>.
```

For fully generic requests there is also an option to return route metric encoding FQDNs unsolicited, in which case no specific indication is needed in the FQDN of the query.

The following sections describe the procedures the MME goes through to acquire the necessary input data for SGW/PGW selection using route specific requests, according to Method 2.

A general note applicable to the procedures below is that when retrieving FQDNs for all SGWs or PGWs that support certain hard selection criteria (e.g. APN support, Tracking Area/service area support, mobility protocol support, etc.), the application of multiple hard selection criteria to the same GW type may cause the procedure to be broken up in several sequential DNS queries, since each hard selection criterion (depending on how it is encoded) may require its own query in the S-NAPTR procedure.

Another general note is that the procedure descriptions below describe the "minimum" procedures. An operator may choose to configure DNS such that one or more NATPR query-response rounds are performed in addition to the ones described in a "minimum" procedure.

Procedure for the Attach Selection Case

The following procedure supports selection of SGW and PGW during Attach.

1. The MME identifies the SeGW (using either of the methods previously described).
2. The MME requests and retrieves FQDNs for all SGWs that fulfil the hard selection criteria (e.g. Tracking Area/service area support, mobility protocol support, etc.).
3. For each SGW identified in step 2 the MME retrieves an FQDN encoding the metrics of the route between the SGW and the identified SeGW. If these route metrics are encoded in a SGW FQDN, the MME retrieves the FQDN by sending a NAPTR query with an identifier of the identified SeGW (e.g. in the form of node name labels or an IP address) included in the query FQDN. If the route metrics are encoded in a SeGW FQDN, the MME retrieves the FQDN by sending a NAPTR query with the remote endpoint node ID associated with the SGW in the query FQDN.

Steps 2 and 3 may possibly be integrated in a single step, if a hard selection criterion and a SeGW identifier can be included in the same query.
4. The MME retrieves FQDNs for all PGWs that fulfil the hard selection criteria (e.g. APN support, mobility protocol support, etc.).

The PGW FQDNs contain metrics for the respective PGW's route to an ASBR.
5. This step is divided into two scenarios, one where only combined SGW/PGW nodes are considered for selection (scenario A) and one where both combined SGW/PGW nodes and separate SGWs and PGWs are considered (scenario B):

Scenario A: Provided that only combined SGWs/PGWs are considered the MME identifies, by matching node name labels, each PGW that is combined with one of the SGWs that support the hard selection criteria (i.e. the SGWs identified in step 2) and thus identifies all usable combined SGW/PGW nodes.

Scenario B: If both combined SGW/PGW nodes and separate SGWs and PGWs can be considered for selection, then the MME retrieves FQDNs encoding metrics for the routes between the identified candidate SGWs and PGWs (i.e. the SGWs and PGWs fulfilling the hard selection criteria). These route metrics may be encoded in SGW FQDNs or PGW FQDNs. If PGW FQDNs are used, the PGW-ASBR route metric may be encoded in the same FQDN, thereby enabling combination of request/retrieval of SGW-PGW route metric and PGW-ASBR route metric.
6. The MME now has metrics for all the routes for all possible selections of SGW and PGW (only combined nodes in the preferred scenario) and can thus evaluate the selections from a path optimization/suitability perspective.

The number of queries needed to retrieve metrics for all potential SGW-PGW routes is equal to the number of candidate SGWs (i.e. the number of SGWs fulfilling the hard selection criteria) multiplied by the number of candidate PGWs (i.e. the PGWs fulfilling the hard selection criteria), i.e. $N_{SGW\text{-}PGW\text{-}route\text{-}queries} = N_{candidate\text{-}SGWs} \times N_{candidate\text{-}PGWs}$. This may make this method unfavourable for the Attach Selection Case. However, efficient caching of DNS responses in the MME may drastically reduce the number of required queries, even down to acceptable numbers. Furthermore, in many PLMNs (maybe even all) all SGWs/PGWs will be combined SGW/PGW nodes (i.e. the SGW and the PGW are integrated in the same node) and using a SGW and a PGW from the same combined node will be the favoured choice during Attach selection cases. In such scenarios retrieval of route metrics for SGW-PGW routes during the Attach selection case will be a non-issue.

Procedure for the SGW Relocation Selection Case

The following procedure supports selection of SGW during SGW relocation.

1. The MME identifies the SeGW (using either of the methods previously described).
2. The MME requests and retrieves FQDNs for all SGWs that fulfil the hard selection criteria (e.g. Tracking Area/service area support, mobility protocol support, etc.).
3. For each SGW identified in step 2 the MME retrieves an FQDN encoding the metrics of the route between the SGW and the identified SeGW. If these route metrics are encoded in a SGW FQDN, the MME retrieves the FQDN by sending a NAPTR query with an identifier of the identified SeGW (e.g. in the form of node name labels or an IP address) included in the query FQDN. If the route metrics are encoded in a SeGW FQDN, the MME retrieves the FQDN by sending a NAPTR query with the remote endpoint node ID associated with the SGW in the query FQDN.

Steps 2 and 3 may possibly be integrated in a single step, if a hard selection criterion and a SeGW identifier can be included in the same query.
4. For each of the current (fixed) PGW(s) the MME requests and retrieves FQDNs for all SGWs retrieved in step 2 and includes an identifier of the PGW in the query FQDNs. Alternatively, the MME, for each of the current (fixed) PGW(s), sends a DNS query for each of the SGWs retrieved in step 2, including an identifier of the SGW in the query FQDN.

Each of the retrieved FQDNs contains a metric of the route between the respective SGW and PGW.
5. The MME now has metrics for all the routes for all possible selections of SGW and can thus evaluate the selections from a path optimization/suitability perspective.

Procedure for the Additional PDN Connection Selection Case

The following procedure supports selection of PGW during establishment of an additional PDN connection.

1. The MME requests and retrieves FQDNs for all PGWs that fulfil the hard selection criteria (e.g. APN support, mobility protocol support, etc.).

Each of the retrieved FQDNs contains a metric of the respective PGW's route to an ASBR.
2. For each of the PGWs identified in step 1 the MME retrieves an FQDN encoding the metrics of the route between the PGW to the current (fixed) SGW. If the route metrics of a SGW-PGW route are encoded in a SGW FQDN, the MME may retrieve the FQDN by sending a NAPTR query for an FQDN associated with the current (fixed) SGW with an identifier of the PGW included in the query FQDN. If the route metrics of a SGW-PGW route are encoded in a PGW FQDN, the MME may retrieve the FQDN by sending a NAPTR query for an FQDN associated with the PGW with an identifier of the SGW included in the query FQDN.

Steps 1 and 2 may possibly be integrated, if a hard selection criterion and a SGW or PGW identifier can be included in the same query.

3. The MME now has metrics for all the routes for all possible selections of PGW and can thus evaluate the selections from a path optimization/suitability perspective.

The following sections describe the procedures the MME goes through to acquire the necessary input data for SGW/PGW selection using partially generic requests, according to Method 2. These procedures are similar to the Method 1 procedures.

A general note applicable to the procedures below is that when retrieving FQDNs for all SGWs or PGWs that support certain hard selection criteria (e.g. APN support, Tracking Area/service area support, mobility protocol support, etc.), the application of multiple hard selection criteria to the same GW type may cause the procedure to be broken up in several sequential DNS queries, since each hard selection criterion (depending on how it is encoded) may require its own query in the S-NAPTR procedure.

Procedure for the Attach Selection Case

The following procedure supports selection of SGW and PGW during Attach.

1. The MME identifies the SeGW (using either of the methods previously described above).
2. The MME retrieves FQDNs for all SGWs and PGWs that fulfil the hard selection criteria (e.g. APN support, Tracking Area/service area support, mobility protocol support, etc.).
   Each retrieved PGW FQDN may contain a metric for the PGW's route to an ASBR.
3. If the PGW FQDNs retrieved in step 2 did not contain metrics of PGW-ASBR routes, the MME, for each PGW identified in step 2, sends a DNS query, including an indication of the partially generic request type "asbr" or "sgw" (if the PGW-ASBR route is encoded in all route metric encoding PGW FQDNs), and retrieves FQDN(s) encoding metrics of the route from the respective PGW to an ASBR and possibly also metrics of the routes from the respective PGW to all potential SGWs.
   This step may possibly be integrated with step 2 as a single step, if a hard selection criterion (e.g. an indication of the concerned APN) and a partially generic request type indicator (e.g. "asbr") can be included in the same query (see above for examples of such query FQDN formats).
4. If the MME performed step 3 and the retrieved PGW FQDNs included metrics of SGW-PGW routes, the MME already has the metrics of all the routes between the SGWs and PGWs identified in step 2). Otherwise, the MME has to retrieve these route metrics via DNS. As one alternative, for each SGW identified in step 2 the MME sends a DNS query including an indication of the partially generic request type "pgw" in the query FQDN (see above for query FQDN format examples). Alternatively the MME, for each PGW identified in step 2, sends a DNS query including an indication of the partially generic request type "sgw" in the query FQDN.
   The FQDNs received in response contain metrics of (at least) the routes between the SGWs and PGWs identified in step 2.
   This step may possibly be integrated with step 2 as a single step, if a hard selection criterion (e.g. an indication of the concerned APN) and a partially generic request type indicator (e.g. "sgw") can be included in the same query (see above for examples of such query FQDN formats).
5. The MME sends a DNS query for FQDNs associated with the identified SeGW, including an indication of partially generic request type "sgw" in the query FQDN, and retrieves FQDNs encoding the metrics of the routes from the SeGW to all potential SGWs (out of which only the FQDNs encoding metrics of the routes to the SGWs identified in step 2 are of interest). Alternatively the MME, for each SGW identified in step 2, sends a DNS query for FQDNs associated with the SGW, including an indication of partially generic request type "segw" in the query FQDN, and retrieves FQDNs encoding the metrics of the routes from the SGW to all potential SeGW(s) (out of which only the FQDN encoding metrics of the route to the SeGW identified in step 1 is of interest).
   The second alternative (retrieving SGW FQDNs encoding metrics of routes to SeGWs) may possibly be integrated with step 2 as a single step, if a hard selection criterion (e.g. an indication of the UE's current TAI) and a partially generic request type indicator (e.g. "segw") can be included in the same query.
   Note that the second alternative (retrieving SGW FQDNs encoding metrics of routes to SeGWs) is inferior to the first alternative (retrieving SeGW FQDNs encoding metrics of routes to SGWs), due to the greater number of queries involved, unless it can be integrated with step 2, in which case it may be the preferred alternative.
6. The MME now has metrics for all the routes for all possible selections of SGW and PGW and can thus evaluate the selections from a path optimization/suitability perspective.

Procedure for the SGW Relocation Selection Case

The following procedure supports selection of SGW during SGW relocation.

1. The MME identifies the SeGW (using either of the methods previously described).
2. The MME retrieves FQDNs for all SGWs that fulfil the hard selection criteria (e.g. Tracking Area/service area support, mobility protocol support, etc.).
3. If an MME relocation is not performed (which it probably is in many cases, e.g. if SGW service areas are coordinated with MME pool areas), the MME already has the route metric encoding PGW FQDNs and thus the route metrics of all relevant SGW-PGW routes. For MME pool changes the same result could be achieved by utilizing the private extension IE (or a new IE) in a GTP-C message to transfer the route metric encoding PGW FQDNs to the new MME. Otherwise, if the route metric encoding PGW FQDNs are not available to the MME, the MME has to retrieve FQDNs encoding metrics of the relevant SGW-PGW routes. As one alternative the MME, for each of the current (fixed) PGW(s), sends a DNS query for FQDNs associated with the PGW, including an indication of partially generic request type "sgw" in the query FQDN, and retrieves FQDNs encoding the metrics of the routes between the PGW and all potential SGWs (out of which only the FQDNs encoding metrics of the routes to the SGWs identified in step 2 are of interest). Alternatively the MME, for each of the SGWs identified in step 2, sends a DNS query for FQDNs associated with the SGW, including an indication of partially generic request type "pgw" in the query FQDN, and retrieves FQDNs encoding the metrics of the routes between the SGW and all potential PGWs (out of which only the FQDN(s) encoding metrics of the route(s) to the current (fixed) PGW(s) is(are) of interest).

The second alternative (retrieving SGW FQDNs encoding metrics of routes to PGWs) may possibly be integrated with step 2 as a single step, if a hard selection criterion (e.g. an indication of the UE's current TAI) and a partially generic request type indicator (e.g. "pgw") can be included in the same query.

Note that the second alternative (retrieving SGW FQDNs encoding metrics of routes to PGWs) is inferior to the first alternative (retrieving PGW FQDNs encoding metrics of routes to SGWs), due to the likely greater number of queries involved, unless it can be integrated with step 1, in which case it may be the preferred alternative.

4. The MME sends a DNS query for FQDNs associated with the identified SeGW, including an indication of partially generic request type "sgw" in the query FQDN, and retrieves FQDNs encoding the metrics of the routes from the SeGW to all potential SGWs (out of which only the FQDNs encoding metrics of the routes to the SGWs identified in step 2 are of interest). Alternatively the MME, for each SGW identified in step 2, sends a DNS query for FQDNs associated with the SGW, including an indication of partially generic request type "segw" in the query FQDN, and retrieves FQDNs encoding the metrics of the routes from the SGW to all potential SeGW(s) (out of which only the FQDN encoding metrics of the route to the SeGW identified in step 1 is of interest).

The second alternative (retrieving SGW FQDNs encoding metrics of routes to SeGWs) may possibly be integrated with step 2 as a single step, if a hard selection criterion (e.g. an indication of the UE's current TAI) and a partially generic request type indicator (e.g. "segw") can be included in the same query.

Note that the second alternative (retrieving SGW FQDNs encoding metrics of routes to SeGWs) is inferior to the first alternative (retrieving SeGW FQDNs encoding metrics of routes to SGWs), due to the greater number of queries involved, unless it can be integrated with step 2, in which case it may be the preferred alternative.

5. The MME now has metrics for all the routes for all possible SGW selections and can thus evaluate the selections from a path optimization/suitability perspective.

Procedure for the Additional PDN Connection Selection Case

The following procedure supports selection of PGW during establishment of an additional PDN connection.

1. The MME retrieves FQDNs for all PGWs that fulfil the hard selection criteria (e.g. APN support, mobility protocol support, etc.).

The PGW FQDNs received in response may contain metrics for each PGW's route to an ASBR.

2. If the PGW FQDNs retrieved in step 1 did not contain metrics of PGW-ASBR routes, the MME, for each PGW identified in step 1, sends a DNS query, including an indication of the partially generic request type "asbr", and retrieves FQDNs encoding metrics of the routes from the respective PGW to all potential SGWs as well as metrics of the route from the respective PGW to an ASBR.

3. If the MME performed step 2 or retrieved SGW FQDNs encoding route metrics to all potential PGWs during the previous SGW selection (in conjunction with an Attach or SGW relocation procedure), the MME already has the metrics of all the routes between the current (fixed) SGW and the relevant PGWs (i.e. the PGWs identified in step 1). Otherwise, if these route metrics are not available to the MME, the MME has to retrieve them via DNS. As one alternative the MME sends a DNS query for FQDNs associated with the current (fixed) SGW, including an indication of partially generic request type "pgw" in the query FQDN, and retrieves FQDNs encoding the metrics of the routes between the current (fixed) SGW and all potential PGWs (out of which only the FQDNs encoding metrics of the routes to the PGWs identified in step 1 are of interest). Alternatively the MME, for each of the PGWs identified in step 1, sends a DNS query for FQDNs associated with the PGW, including an indication of partially generic request type "sgw" in the query FQDN, and retrieves (for each of the PGWs) FQDNs encoding the metrics of the routes between the PGW and all potential SGWs (out of which only the FQDNs encoding metrics of the routes to the current (fixed) SGW are of interest).

The second alternative (retrieving PGW FQDNs encoding metrics of routes to SGWs) may possibly be integrated with step 1 as a single step, if a hard selection criterion (e.g. an indication of the concerned APN) and a partially generic request type indicator (e.g. "sgw") can be included in the same query.

Note that the second alternative (retrieving PGW FQDNs encoding metrics of routes to SGWs) is inferior to the first alternative (retrieving SGW FQDNs encoding metrics of routes to PGWs), due to the greater number of queries involved, unless it can be integrated with step 1, in which case it may be the preferred alternative.

4. The MME now has metrics for all the relevant routes for all possible PGW selections and can thus evaluate the selections from a path optimization/suitability perspective.

The following sections describe the procedures the MME goes through to acquire the necessary input data for SGW/PGW selection using fully generic requests, according to Method 1. These procedures are rather similar to the Method 1 procedures.

A general note applicable to the procedures below is that when retrieving FQDNs for all SGWs or PGWs that support certain hard selection criteria (e.g. APN support, Tracking Area/service area support, mobility protocol support, etc.), the application of multiple hard selection criteria to the same GW type may cause the procedure to be broken up in several sequential DNS queries, since each hard selection criterion (depending on how it is encoded) may require its own query in the S-NAPTR procedure.

Another note is that the fully generic request may be implemented using a special request type indication in the query FQDN (as described above) or without explicit request type indication, in which case the route metric encoding FQDNs are returned unsolicited. When route metric encoding FQDNs are returned unsolicited, the SGW/PGW selection procedures are the same as for method 1 with the only difference being that metrics of multiple routes are encoded and returned in multiple FQDNs instead of in a single FQDN. Therefore, to avoid too much repetition only the procedures using explicitly indicated fully generic requests are described below.

Procedure for the Attach Selection Case

The following procedure supports selection of SGW and PGW during Attach.
1. The MME identifies the SeGW (using either of the methods previously described).
2. The MME retrieves FQDNs for all SGWs and PGWs that fulfil the hard selection criteria (e.g. APN support, Tracking Area/service area support, mobility protocol support, etc.).
   The retrieved PGW FQDNs may contain metrics for the respective PGW's route to an ASBR.
3. If the PGW FQDNs retrieved in step 2 did not contain metrics of PGW-ASBR routes, the MME, for each PGW identified in step 2, sends a DNS query, including a fully generic request type indication, and retrieves FQDNs encoding metrics of the routes from the respective PGW to all potential SGWs as well as metrics of the route from the respective PGW to an ASBR.
   This step may possibly be integrated with step 2 as a single step, if a hard selection criterion (e.g. an indication of the concerned APN) and a fully generic request type indicator can be included in the same query (see above for examples of such query FQDN formats).
4. If the MME performed step 3, the MME already has the metrics of all the routes between the SGWs and PGWs identified in step 2. Otherwise, the MME, for each SGW identified in step 2, sends a DNS query for FQDNs associated with the SGW, including an indication of the fully generic request type in the query FQDN (see above for query FQDN format examples), and retrieves FQDNs encoding metrics of the routes between the SGW and all potential PGWs and SeGWs.
   The FQDNs received in response contain metrics of (at least) the routes between the SGWs and PGWs identified in step 2 as well as the routes between the SGWs identified in step 2 and the SeGW identified in step 1.
   This step may possibly be integrated with step 2 as a single step, if a hard selection criterion (e.g. an indication of the UE's current TAI) and a fully generic request type indicator can be included in the same query (see above for examples of such query FQDN formats).
5. If the MME performed step 3 and consequently did not retrieve the route metric encoding SGW FQDNs in step 4, the MME sends a DNS query for FQDNs associated with the identified SeGW, including an indication of the fully generic request type in the query FQDN, and retrieves FQDNs encoding the metrics of the routes from the SeGW to all potential SGWs (out of which only the FQDNs encoding metrics of the routes to the SGWs identified in step 2 are of interest). Alternatively the MME, for each SGW identified in step 2, sends a DNS query for FQDNs associated with the SGW, including a fully generic request type indication in the query FQDN, and retrieves FQDNs encoding the metrics of the routes from the SGW to all potential SeGW(s) (out of which only the FQDN encoding metrics of the route to the SeGW identified in step 1 is of interest). Alternatively, the MME, for each SGW identified in step 2, sends a DNS query for FQDNs associated with the SGW, including a fully generic request type indication in the query FQDN, and retrieves FQDNs encoding metrics of the routes between the SGW and all potential PGWs and SeGWs (out of which the metrics of the routes to PGWs are redundant, since they were retrieved in step 3, and only the metrics of the route to the SeGW identified in step 1 are of interest).
   The second alternative (retrieving SGW FQDNs encoding metrics of routes to PGWs and SeGWs) may possibly be integrated with step 2 as a single step, if a hard selection criterion (e.g. an indication of the UE's current TAI) and a fully generic request type indication can be included in the same query.
   Note that the second alternative (retrieving SGW FQDNs encoding metrics of routes to PGWs and SeGWs) is inferior to the first alternative (retrieving SeGW FQDNs encoding metrics of routes to SGWs), due to the greater number of queries involved, unless it can be integrated with step 2, in which case it may be the preferred alternative
6. The MME now has metrics for all the routes for all possible selections of SGW and PGW and can thus evaluate the selections from a path optimization/suitability perspective.

Procedure for the SGW Relocation Selection Case

The following procedure supports selection of SGW during SGW relocation.
1. The MME identifies the SeGW (using either of the methods previously described).
2. The MME retrieves FQDNs for all SGWs that fulfil the hard selection criteria (e.g. Tracking Area/service area support, mobility protocol support, etc.).
3. If an MME relocation is not performed (which it probably is in many cases, e.g. if SGW service areas are coordinated with MME pool areas), the MME may already have the route metric encoding PGW FQDNs and thus the route metrics of all relevant SGW-PGW routes. This would be the case if the SGW-PGW route metrics available in the MME were previously retrieved in the form of route metric encoding SGW FQDNs (which is one alternative in the procedure for the Attach selection case described above and also a possible alternative in the procedure for the SGW relocation selection case).
   For MME pool changes, the same result could be achieved by utilizing the private extension IE (or a new IE) in a GTP-C message to transfer the route metric encoding PGW FQDNs to the new MME (provided that these FQDNs were available to the old MME). Otherwise, if the route metric encoding PGW FQDNs are not available to the MME, the MME has to retrieve FQDNs encoding metrics of the relevant SGW-PGW routes. As one alternative the MME, for each of the current (fixed) PGW(s), sends a DNS query for FQDNs associated with the PGW, including an indication of the fully generic request type in the query FQDN, and retrieves FQDNs encoding the metrics of the routes between the PGW and all potential SGWs (out of which only the FQDNs encoding metrics of the routes to the SGWs identified in step 2 are of interest) as well as metrics of the route from the PGW to an ASBR. Alternatively the MME, for each of the SGWs identified in step 2, sends a DNS query for FQDNs associated with the SGW, including an indication of the fully generic request type in the query FQDN, and retrieves FQDNs encoding the metrics of the routes between the SGW and all potential PGWs (out of which only the FQDN(s) encoding metrics of the route(s) to the current (fixed) PGW(s) is(are) of interest) as well as metrics of the routes from the SGW to all possible SeGWs (out of which only the FQDN(s) encoding metrics of the route to the SeGW identified in step 1 is of interest).

The second alternative (retrieving SGW FQDNs encoding metrics of routes to PGWs and SeGWs) may possibly be integrated with step 2 as a single step, if a hard selection criterion (e.g. an indication of the UE's current TAI) and a fully generic request type indicator can be included in the same query.

Note that the second alternative (retrieving SGW FQDNs encoding metrics of routes to PGWs and SeGWs) will likely require a greater number of DNS queries than retrieving the relevant PGW FQDNs (unless it can be integrated in step 2). On the other hand, the second alternative also provides the route metrics of the routes from the potential SGWs to the SeGW identified in step 2).

4. If the MME did not retrieve the metrics of the relevant SGW-SeGW routes in step 3, the MME sends a DNS query including an identifier (e.g. in the form of node name labels) associated with the identified SeGW as well as an indication of the fully generic request type in the query FQDN, and retrieves FQDNs encoding the metrics of the routes from the SeGW to all potential SGWs (out of which only the FQDNs encoding metrics of the routes to the SGWs identified in step 2 are of interest).

5. The MME now has metrics for all the routes for all possible SGW selections and can thus evaluate the selections from a path optimization/suitability perspective.

Procedure for the Additional PDN Connection Selection Case

The following procedure supports selection of PGW during establishment of an additional PDN connection.

1. The MME retrieves FQDNs for all PGWs that fulfil the hard selection criteria (e.g. APN support, mobility protocol support, etc.).

These FQDNs may contain metrics for the respective PGW's route to an ASBR.

2. If the PGW FQDNs retrieved in step 1 did not contain metrics of PGW-ASBR routes, the MME, for each PGW identified in step 1, sends a DNS query, including a fully generic request type indication, and retrieves FQDNs encoding metrics of the route from the respective PGW to and ASBR as well as metrics of the routes from the respective PGW to all potential SGWs (out of which only the FQDN encoding metrics of the route from the PGW to the current (fixed) SGW is of interest).

3. Even if the MME did not retrieve metrics of the relevant SGW-PGW routes in step 2, the MME may (likely) already have the route metric encoding FQDNs of the current (fixed) SGW (retrieved during the previous SGW selection), in which case it does not have to retrieve them. Otherwise, if the metrics of the relevant SGW-PGW routes are still not available to the MME at this stage, the MME sends a DNS query for FQDNs associated with the current (fixed) SGW, including a fully generic request type indication in the query FQDN, and retrieves FQDNs encoding metrics of the routes from the current (fixed) SGW to all potential PGWs (out of which only the FQDNs encoding metrics of routes to the PGWs identified in step 1 are of interest).

4. The MME now has metrics for all the relevant routes for all possible PGW selections and can thus evaluate the selections from a path optimization/suitability perspective.

Figure 5:
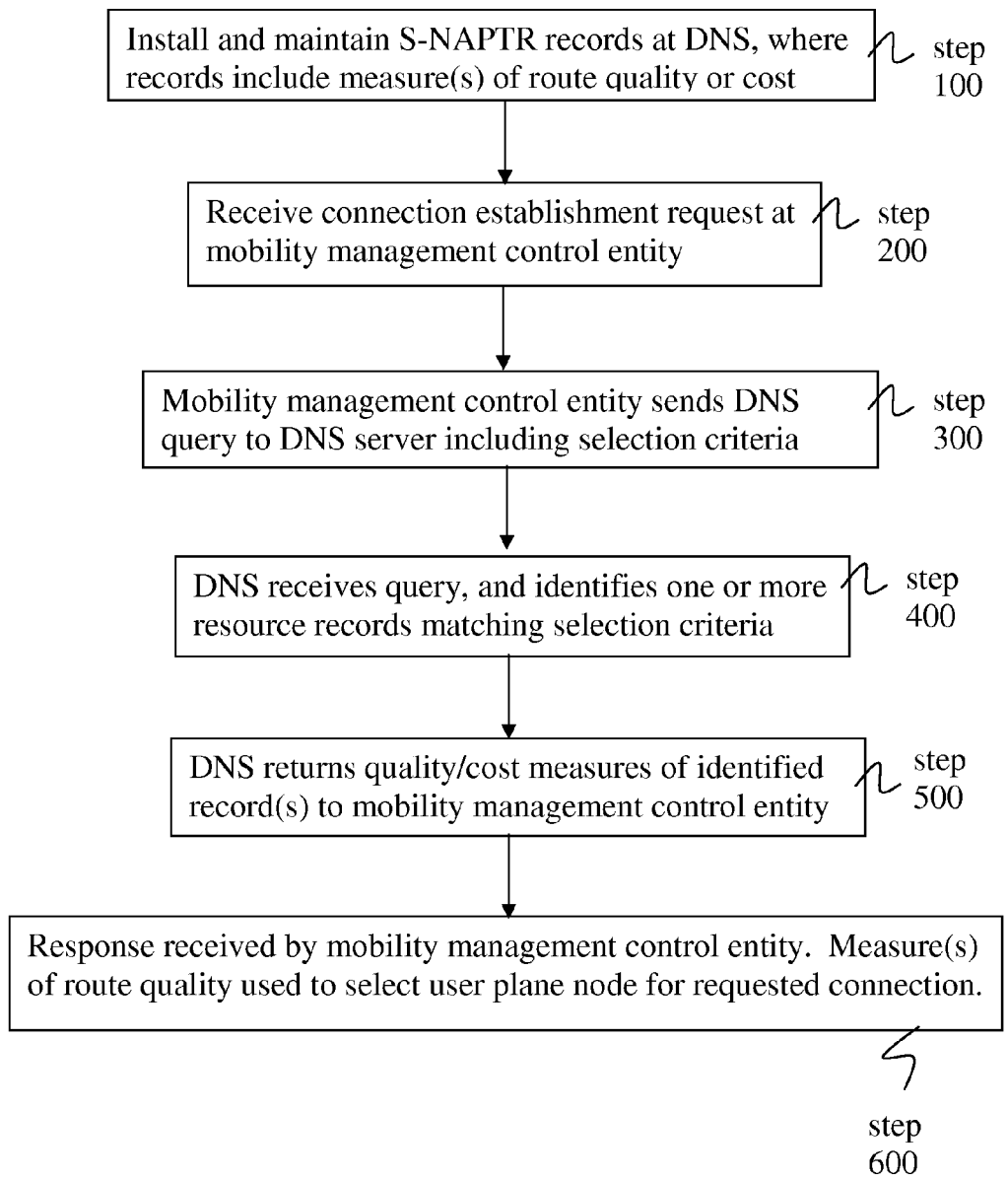
FIG. 5 shows a flow diagram showing an overview of a procedure for allocating nodes to a connection being established across an EPC.

FIG. 5 is a flow diagram illustrating the high level steps involved in the described method of allocating network nodes to a connection being established, e.g. over an EPS network. At step 100, the appropriate DNS resource (NAPTR) records are installed and maintained at the DNS server. This step of course involves an initial set up step and ongoing maintenance, e.g. as new nodes are added and old nodes removed. At step 200, a connection request is received at the mobility management control entity. Typically, a connection request is initiated by a network subscriber. At step 300, the mobility management control entity generates and sends a DNS query to the DNS server. The query includes some node selection criteria. Then, at step 400, the DNS receives the query and uses the criteria to identify one or more relevant NAPTR resource records. These records represent one or more candidate nodes for the connection. At step 500, the DNS returns the identified resource records to the mobility management control entity. Finally, at step 600, the mobility management control entity identifies the route quality (or cost) measures contained within the received resource record(s) to select a suitable node.

Figure 1:
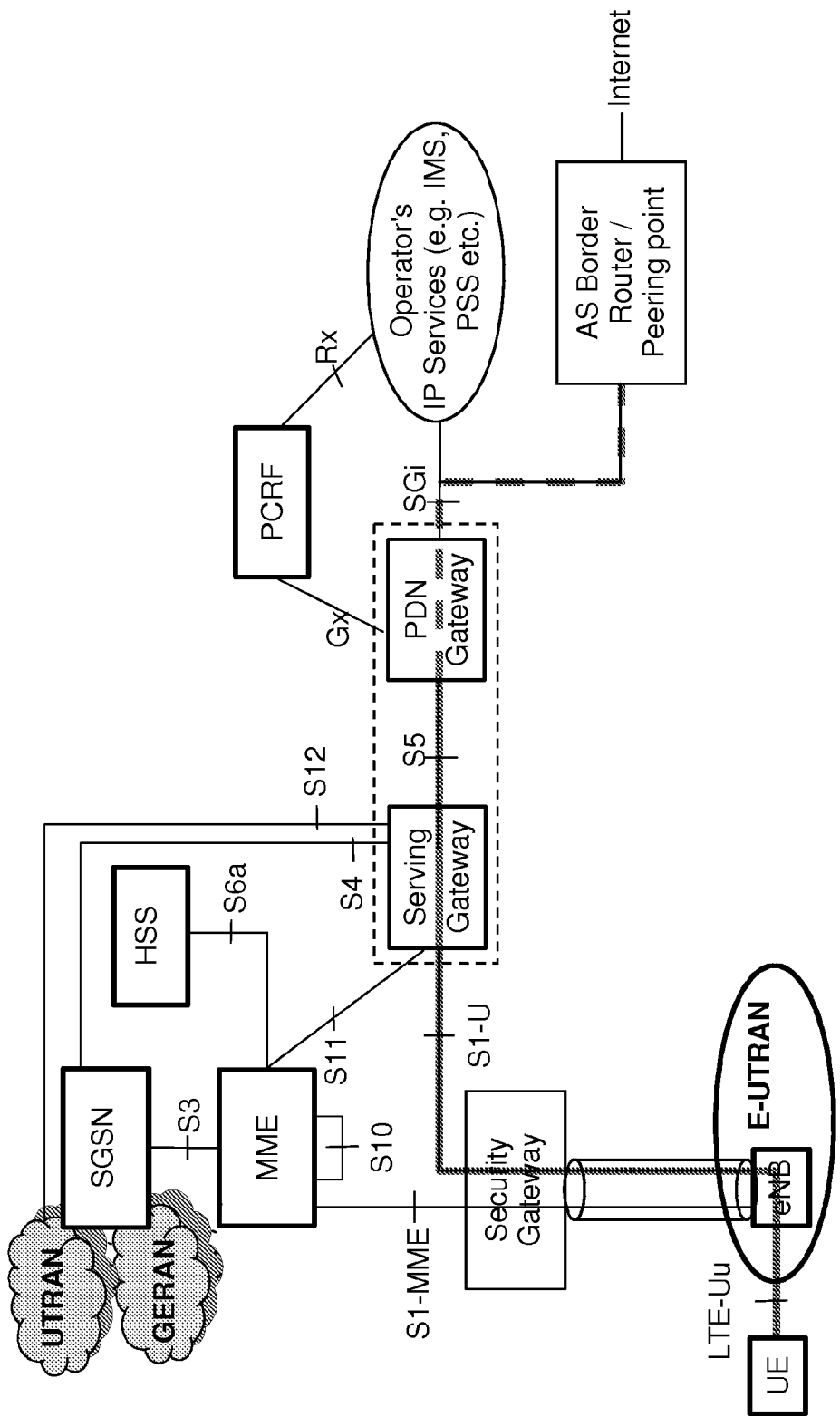
FIG. 1 illustrates schematically an Evolved Packet System comprising an Evolved Packet Core network.
Figure 3:
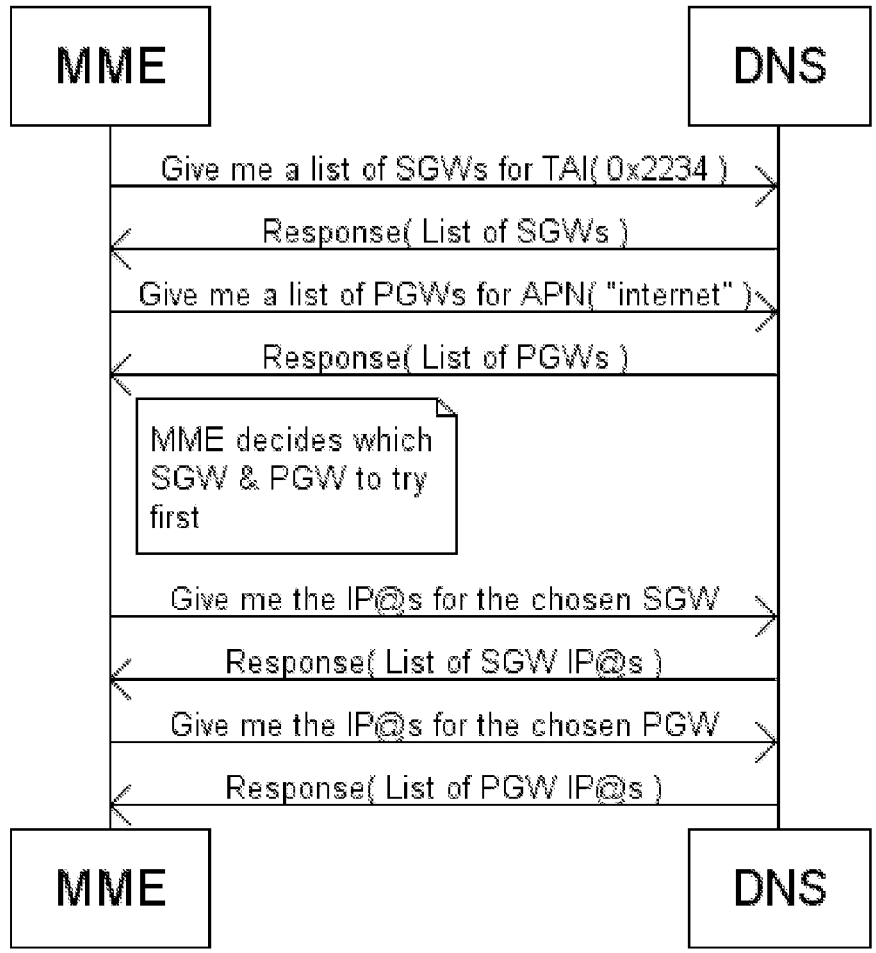
FIG. 3 shows a simplified signal exchange between a Mobility Management Entity and a DNS server of an EPS, associated with a prior art node allocation procedure.
Figure 6:
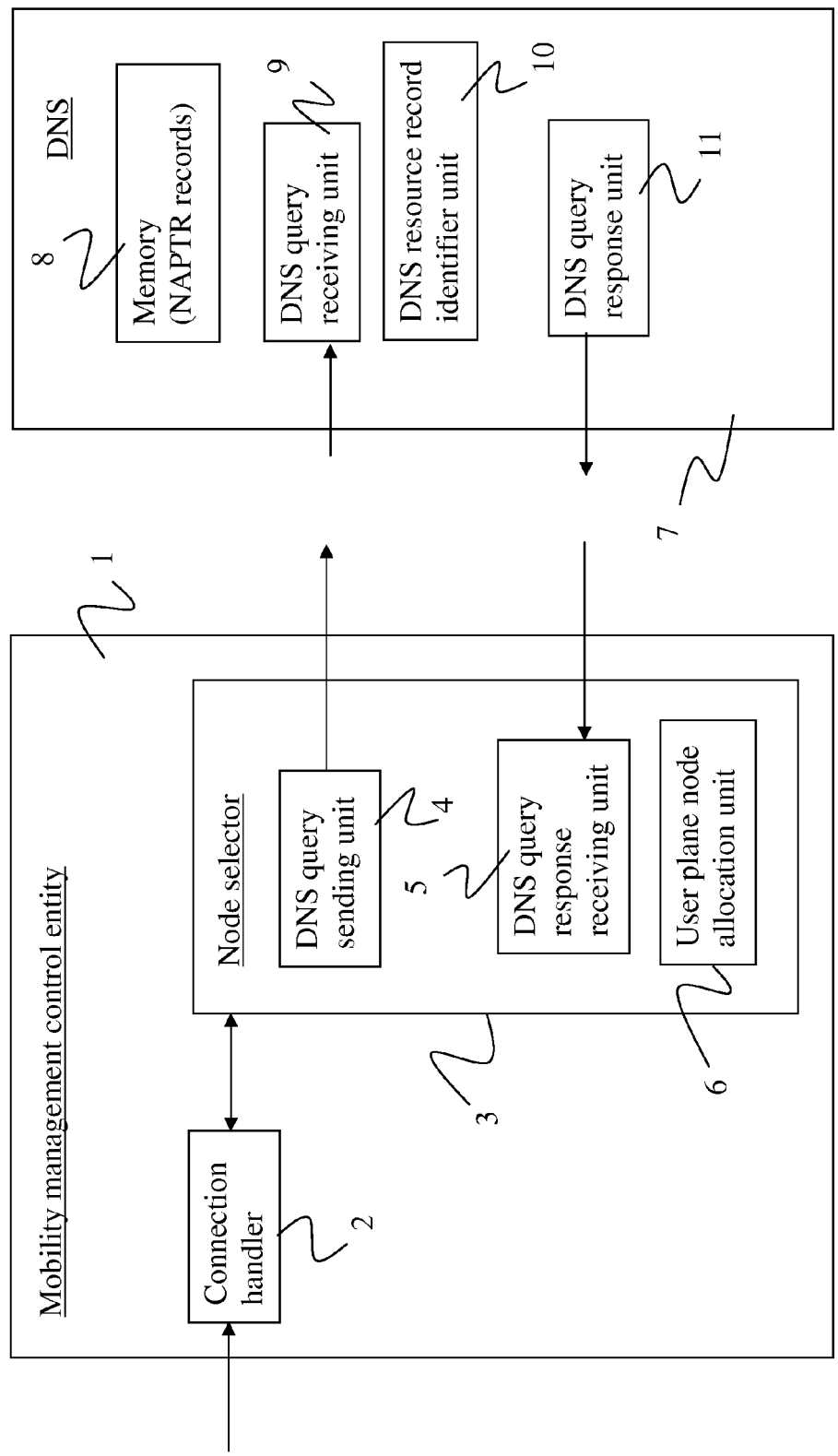
FIG. 6 illustrates schematically a mobility management control entity and a DNS server that cooperate to implement the allocation procedure of FIG. 5.

Referring now to FIG. 6, this illustrates on the left hand side of the figure a mobility management control entity 1. A connection handler 2 is responsible for receiving connection establishment requests, e.g. via the S1-MME interface (see FIG. 1).

These are processed in part by a node selector 3 which is responsible for selecting nodes for the connection, such as the SGW and PGW in an EPS network. The node selector determines and/or identifies criteria for node selection, and uses these to construct a DNS query. The query is sent out towards the DNS by a DNS query sending unit 4. The response is received from the DNS by a DNS query response receiving unit 5. The response is passed to a user plane node allocation unit 6. This unit analyses the route quality or cost measure(s) included in the (NAPTR records of) the response, and uses the result to allocate an appropriate node to the connection.

The right hand side of FIG. 6 illustrates at a high level an exemplary DNS server 7. The DNS server includes a (database) memory 8 in which are stored a set of resource records, e.g. NAPTR records. [It will be appreciated that the memory 8 may be provided in the same server that processes received queries, or as a separate database.] These may be installed and managed by network operator management functions. A DNS query receiving unit 9 receives DNS queries sent to the DNS server by mobility management control entities within the core network. The unit 9 passes the query to a DNS resource record identifier unit 10 which processes the query, examining the node selection criteria that it contains, and extracts appropriate resource records from the memory 8. The identified resource records are then passed to a DNS query response unit 11 which sends out a response, containing these resource records, to the querying mobility management entity.

It will be appreciated that variations may be introduced to the methods described above. A few of these are outlined in the following.

Proactive, Delay Insensitive Collection of Route Metrics

Although SGW/PGW selection procedures are only moderately delay sensitive, the delay incurred by potentially multiple DNS queries is undesirable and it may be beneficial to provide mechanisms to avoid it. One way is to decouple the DNS procedures related to route metric acquisition from the actual SGW/PGW selection events. An MME could instead use the DNS procedures to acquire route metrics as a background process, typically performed during periods of low load, such as night time.

Figure 7:
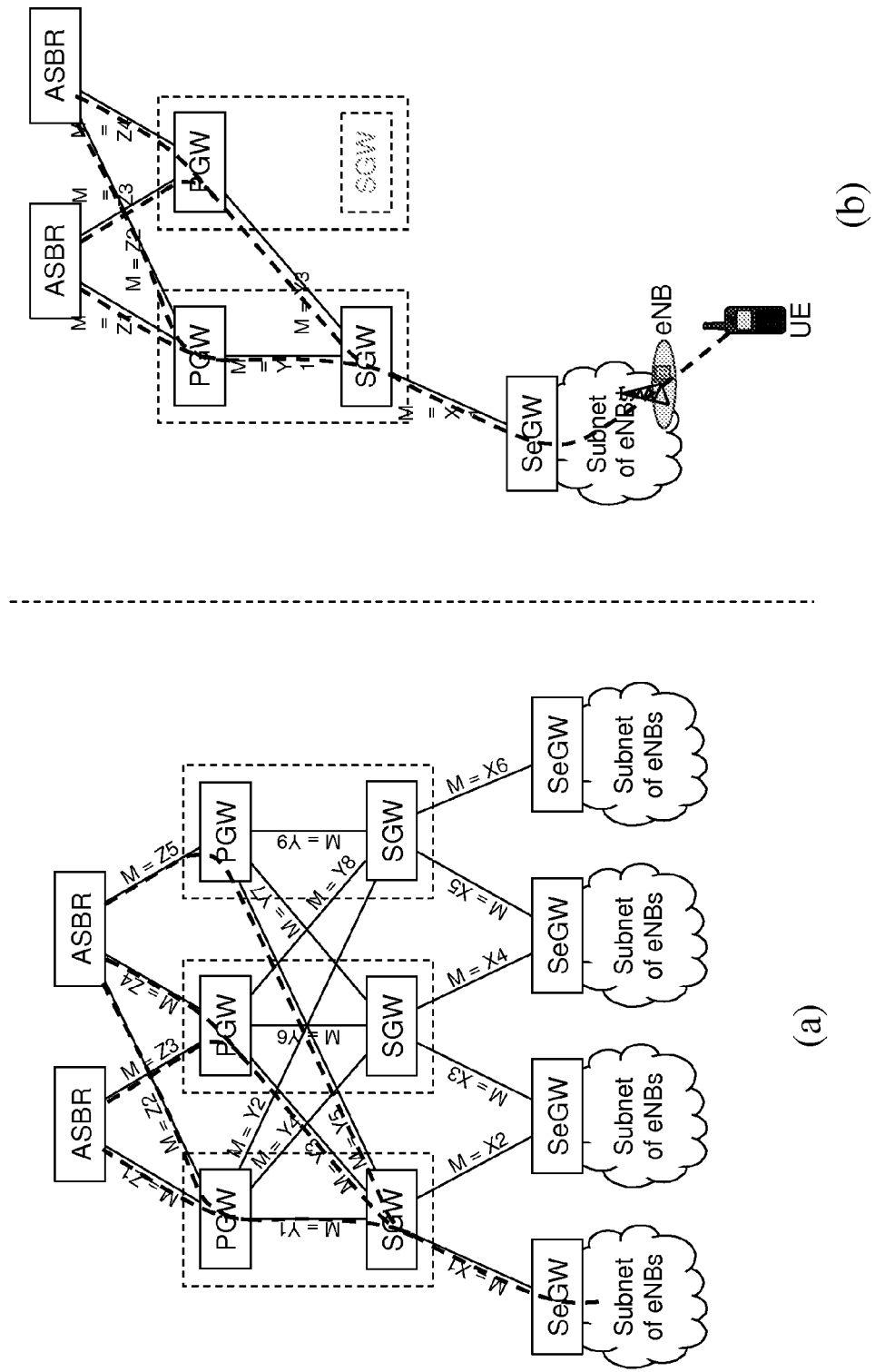
FIG. 7 illustrates a route "pruning" procedure carried out in an EPC network in order to allocate nodes to a connection.

The MME would use the proactively retrieved route metrics to build and maintain an overlay network graph consisting of the nodes that are relevant for path evaluations, i.e. SeGWs (or possibly SeGW subnets), SGWs, PGWs and ASBRs. While these nodes would constitute the vertices of the graph, their possible interconnecting routes (i.e. SeGW-SGW, SGW-PGW and PGW-ASBR routes) would be represented by edges connecting the vertices of the graph. The MME would also associate a route metric with each route/edge in the graph. Since route topologies and route properties are semi-dynamic the MME would continuously retrieve route metrics to maintain reasonably fresh data in the graph. FIG. 7(a) illustrates an example of a simple overlay network graph, where "M" denotes the route metric associated with each route in the graph. The dashed boxes indicate that the contained nodes (a SGW and a PGW) may be combined. The broken lines indicate the available paths from one particular SeGW subnet to any ASBR.

During the actual SGW/PGW selection events, the MME would use the regular DNS procedure (i.e. without route metric retrieval extensions) to prune the overlay network graph, leaving only the fixed nodes and the candidate nodes that fulfill the hard selection criteria. For the path evaluation the MME would use the route metrics of the pruned overlay network graph. FIG. 7(b) shows an example of such a pruned overlay network graph (based on the graph of FIG. 7(a)). In this example only the left SGW serves the area of the current eNB and the left and the middle PGW support the current APN (and any other hard selection criterion), resulting in four possible paths for this selection case. To evaluate the paths the metrics of the different routes that they consist of would typically be added together. Hence, the left route through the left PGW would have the combined metric X1+Y1+Z1, the other route through the same PGW would have the combined metric X1+Y1+Z2, the left route through the right PGW would have the combined metric X1+Y3+Z3, and the combined metric of last route would be X1+Y3+Z4.

Dealing with Legacy MMEs

In a network where not all MMEs support the scheme proposed here, care must be taken to ensure that the DNS extensions do not disturb the SGW/PGW selection procedure as performed by the legacy MMEs (i.e. in essence the solution should be backwards compatible). This means that a response to a DNS query from a legacy MME should trigger a response including the kind of information that the legacy MME expects. The response may include additional information too as long as this is transparent to the legacy MME. It also means that if a route encoding FQDN is sent to a legacy MME, the DNS server(s) must be configured to anticipate a previously returned route encoding FQDN in a query. Note that in roaming scenarios legacy MMEs in other PLMNs may also send DNS queries.

Some alternative ways to deal with a mixture of legacy MMEs and MMEs that support the proposed scheme include (but are not necessarily limited to):

Configure a suitable DNS RR matching each possible output route metric encoding FQDN, which RR is to be used to provide a response to a query including a metric-encoding FQDN. (Note that this may not only be used by legacy MMEs, but possibly also by MMEs supporting the novel mechanisms, depending on whether the supporting logic in the MME stipulates that a route metric encoding FQDN should be stripped off the route metric encoding labels (turning the FQDN into a "regular" FQDN) before it is used in a query.)

Use different DNS zones for metric-encoding-aware and non-metric-encoding-aware MMEs. For instance, the regular eps.mnc<MNC>.mcc<MCC>.3gppnetwork.orgzone could be used for the non-metric-encoding-aware MMEs while the eps.metric-encoding-zone.operator.com (or some other domain name) zone could be used for metric-encoding-aware MMEs.

Use a special query format for metric-encoding-aware MMEs, e.g. a special label appended to the left of the query FQDN. Regular queries would trigger regular DNS responses, while the special queries would trigger responses with FQDNs including encoded route metrics.

Encoding Multiple Route Metric Types per FQDN

The possibility to use multiple types of route metrics has been mentioned previously and optional route metric type indicators have been suggested for both route metric encoding FQDNs and query FQDNs. However, what has not been mentioned, but which is also conceivable, is to include multiple metrics of different types for the same route and in the same FQDN, e.g. the metric used by the routing protocol in the network (e.g. OSPF and/or IBGP), a delay related metric and a cost related metric (or any other combination of different metric types).

The examples of route metric encoding FQDNs with (optional) route metric indications presented above may easily be extended to a more generalized form that allows multiple route metrics of different types for the same routes. The following are the resulting route metric encoding extended FQDN examples.

For Method 1:

metric-<route metric>.[metric-type-<route metric type>.][...metric-<route metric>.[metric-type-<route metric type>.]]<remote endpoint node ID>.route-metric.metric-<route metric>.[metric-type-<route metric type>.][...metric-<route metric>.[metric-type-<route metric type>.]]<remote endpoint node ID>.route-metric.<interface label>.<node name labels>.

For Method 2:

<route metric>.[metric-type-<route metric type>.][...metric-<route metric>.[metric-type-<route metric type>.]]<interface label>.<node name labels>.
<route metric>.[metric-type-<route metric type>.][...metric-<route metric>.[metric-type-<route metric type>.]]<remote endpoint node ID>.<interface label>.<node name labels>.
metric-<route metric>.[metric-type-<route metric type>.][...metric-<route metric>.[metric-type-<route metric type>.]]<remote endpoint node ID>.route-metric.<interface label>.<node name labels>.

The absence of a metric type indicator implies that the associated route metric is a default type of metric. Likewise, the examples of query FQDNs with (optional) route metric indications presented above may easily be extended to a more generalized form that allows indications of multiple route metric types to be included in a single query FQDNs. The following are the resulting extended query FQDN examples.

For Route Specific Requests:

<remote endpoint node ID>.[metric-type-<route metric type>.][...metric-type-<route metric type>.]route-specific-request.<interface label>.<node name labels>.
<remote endpoint node ID>.[metric-type-<route metric type>.][...metric-type-<route metric type>.]route-specific-request.<APN labels>.apn.<interface label>.<node name labels>.
<APN labels>.apn.[metric-type-<route metric type>.][...metric-type-<route metric type>.]<remote endpoint node ID>.route-specific-request.<interface label>.<node name labels>.
<remote endpoint node ID>.[metric-type-<route metric type>.][...metric-type-<route metric type>.]route-specific-request.tac-lb<TAC low -continued

```
byte>.tac-hb<TAC   high byte>.tac.<interface label>.<node
name labels>.
tac-lb<TAC  low   byte>.tac-hb<TAC   high   byte>.tac.[metric-type-
<route   metric type>.][...metric-type-<route metric type>.]<remote
endpoint node ID>.route-specific-request.<interface label>.<node name
labels>.
```

For Partially Generic Requests:

```
[metric-type-<route metric type>.][...metric-type-<route   metric
type>.]<remote endpoint node type>.partially-generic-request.<interface
label>.<node name labels>.[metric-type-<route   metric   type>.]
[...metric-type-<route  metric  type>.]partially-generic-request-
<remote endpoint node type>.<interface label>.<node name labels>.
[metric-type-<route  metric  type>.][...metric-type-<route  metric
type>.]<remote endpoint   node   type>.partially-generic-request.<APN
labels>.apn.<interface label>.<node name labels>.
<APN labels>.apn.[metric-type-<route   metric   type>.][...metric-
type-<route  metric type>.]<remote    endpoint    node
type>.partially-generic-request.<interface label>.<node name labels>.
[metric-type-<route metric type>.][...metric-type-<route metric
type>.]<remote endpoint node type>.partially-generic-request.tac-lb<TAC
low byte>.tac-hb<TAC high byte>.tac.<interface label>.<node name
labels>.
tac-lb<TAC low byte>.tac-hb<TAC    high   byte>.tac.[metric-type-<route
metric type>.][...metric-type-<route metric type>.]<remote endpoint node
type>.partially-generic-request.<interface label>.<node name labels>.
```

For Fully Generic Requests:

```
[metric-type-<route metric type>.][...metric-type-<route metric
type>.]fully-generic-request.<interface label>.<node name labels>.
[metric-type-<route metric type>.][...metric-type-<route metric
type>.]fully-generic-request.<APN labels>.apn.<interface
label>.<node name labels>.
[metric-type-<route metric type>.][...metric-type-<route metric
type>.]fully-generic-request.tac-lb<TAC low byte>.tac-hb<TAC
high byte>.tac.<interface label>.<node name labels>.
```

If route metric type indications are used in query FQDNs, then responses should match queries in terms of route metric types, e.g. a query with a query FQDN including route metric type indications for metric types X and Y should trigger a response including route metrics of types X and Y.

It would also be possible to use multiple route metrics of different types per route in the responses without using route metric type indications in the query FQDNs. In such a case it is reasonable that the responses always include all available (or a predefined set of) route metrics for each route in the route metric encoding FQDN(s) in the response.

Multiple route metrics of different types for the same route may be useful for an MME during SGW/PGW selection in several ways.

The MME may compare and evaluate different route metrics, e.g. cost, delay and packet loss probability separately like three separate soft selection criteria and possibly balance them against each other (e.g. cost against delay etc.) as well as against other soft criteria.

The MME may also choose to use different metrics for different APNs (i.e. depending on the APN that is associated with the PDN connection that the SGW/GPW selection concerns). For instance, for an APN which indicates that delay sensitive services will be used the MME may choose to emphasize a delay related metric. If the concerned PDN connection already has dedicated QoS bearers established, the MME may use the QoS as guidelines when using the route metrics. For instance, if the guaranteed bit rate (GBR) of one or more dedicated bearer or the aggregate maximum bit rate (AMBR) of the entire PDN connection is high (indicating that high data volume services are being used), then the MME may choose to emphasize a cost related metric.

Another example is that the MME may choose to use/emphasize different route metric types based on the user's subscription type. For instance, using the gold-silver-bronze subscription paradigm, the MME may choose to emphasize delay and packet loss probability related metrics for gold subscribers, whereas a cost related metric may be emphasized for bronze subscribers.

Roaming Scenarios with Dedicated Peering Arrangements

Some operators establish dedicated peering arrangement with each other in order to bypass inter-operator carriers. Such arrangements involve dedicated ASBRs to be used in roaming cases with home routed traffic involving the two operator's networks. Such roaming scenarios may be of interest to consider in the context of the approach described here, since they include preference for one (or a few) dedicated ASBR(s) (denoted $ASBR_d$).

In order to take the existence of the preferred $ASBR_d(s)$ into account, two additional routes should be considered:
The SGW-$ASBR_d$ route in the visited PLMN.
The PGW-$ASBR_d$ route in the home PLMN.

The SGW-$ASBR_d$ route is of interest during SGW selection and the PGW-$ASBR_d$ route is of interest during PGW selection. The SGW-$ASBR_d$ route is elaborated first.

The serving MME in the visited network is responsible for selecting both the SGW in the visited network and the PGW in the home network. When selecting the SGW in the visited network the MME should retrieve metrics for the SGW-$ASBR_d$ route. This route is a part of the visited network and hence the DNS of the visited network will provide the requested information.

The metrics of a SGW-$ASBR_d$ route could be encoded in a SGW FQDN as the metric of any other route, provided that a suitable form of remote endpoint node ID can be found for the SGW-$ASBR_d$, by which the MME can identify the relevant route metric. One possible remote endpoint node ID format for an SGW-$ASBR_d$ would be "peering-<MNC>-<MCC>" as a single label (where <MNC> and <MCC> are the respective MNC and MCC for the PLMN which the ASBR is used for peering with). Another possible remote endpoint node ID format would be "mnc<MNC>.mcc<MCC>.peering" as three labels. Note that if the same ASBR is used for peering with more than one PLMN, these remote endpoint node ID formats require that the SGW-$ASBR_d$ route be encoded once for each peering PLMN (since the PLMN ID of the peering PLMN is included in the remote endpoint node ID), i.e. they are basically considered to be separate routes to different ASBRs (but this could be avoided by using a single remote endpoint node ID for the $ASBR_d$ and then configure the MMEs to know which PLMNs the $ASBR_d$ is used for peering with). If multiple $ASBR_d$s are used for peering towards a certain PLMN, this would still be encoded as a single route metric in the SGW FQDN, either reflecting the "best" route to one of the $ASBR_d$s or a weighted average (in accordance with the assumed traffic distribution) of the metrics of the routes to all the $ASBR_d$s.

In method 2 the same remote endpoint node ID formats could be used in the query FQDN of route specific requests. For partially generic requests the remote endpoint node type label in the query FQDN could be e.g. "asbrd".

The PGW-$ASBR_d$ route in the home PLMN is slightly different since the route metrics (encoded in PGW FQDN(s)) have to be provided by the DNS in the home PLMN to the serving MME in the visited PLMN. Hence, a first consequence of this is that both the visited PLMN and the home PLMN has to support the inventive mechanisms in order for the scheme to work. Another consequence is that the DNS of the home PLMN has to identify the encoded route metrics of the PGW-ASBR$_d$ route using a remote endpoint node ID (of the ASBR$_d$ in a PGW FQDN) that the MME in the visited PLMN can interpret. Fortunately, the remote endpoint node IDs introduced above in conjunction with the SGW-ASBR$_d$ route both fulfil this criterion. Thus, the relevant route metric is the one that has the MNC and MCC of the visited PLMN in its associated remote endpoint node ID.

Query FQDNs in route specific requests and partially generic requests could be the same as above (although they would be associated with PGWs instead of SGWs). To ensure that an MME in a visited PLMN actually selects the PGW that is the most favourable for the peering arrangement (considering the PGW-ASBR$_d$ routes), the home PLMN operator may choose to encode only the most favourable PGW-ASBR$_d$ routes in FQDNs (one or a few for each dedicated peering arrangement) and omit the route metrics suboptimal routes. This way, an MME in a visited PLMN using route specific requests or partially generic requests would only receive FQDNs of the most favourable PGW(s). Queries pertaining to other PGWs would not trigger a response with an FQDN but rather an error message. However, for fully generic requests or unsolicited returned route metrics (method 1) the querying MME will receive FQDNs for all PGWs matching the query. Although only the most favourable of these PGWs will have the relevant PGW-ASBR$_d$ route metric encoded in its FQDN, nothing (but good will) prevents the MME from selecting one of the other PGWs.

For route specific requests the home PLMN operator may also impact the PGW selection through the ORDER parameters in the NAPTR RRs, i.e. by setting lower ORDER parameter value(s) for the RR(s) associated with the favourable PGW(s) than for other RRs, since the NAPTR RR(s) with the lowest ORDER parameter should have precedence before other NAPTR RRs in a set of matching NAPTR RRs. However, a misbehaving (even malicious) MME may still override the ORDER parameters, so at the end of the day the home PLMN operator is in the hands of the operator of the visited PLMN also when this method is used.

Automated Configuration of DNS Server(s)

To provide low administrational overhead it is preferable if the configuration of the route metric information in FQDNs and RRs in the DNS server(s) could be automated to the largest extent possible. A way to achieve this is to leverage the data managed by a network planning tool in terms of e.g. network topology data, route metric data and traffic engineering policies/data. From this data the route metrics to be encoded in FQDNs could be derived. The relevant data would be extracted from the network planning tool, possibly processed by a possible intermediate O&M entity and fed into a DNS configuration tool, which would configure the DNS server(s) accordingly. This would occur on a broad scale when a network is deployed and continuously used for updates when new nodes are deployed or removed or when other relevant changes occur, such as changes in the transport network topology, changes in link capacities or route metrics.

Figure 8:
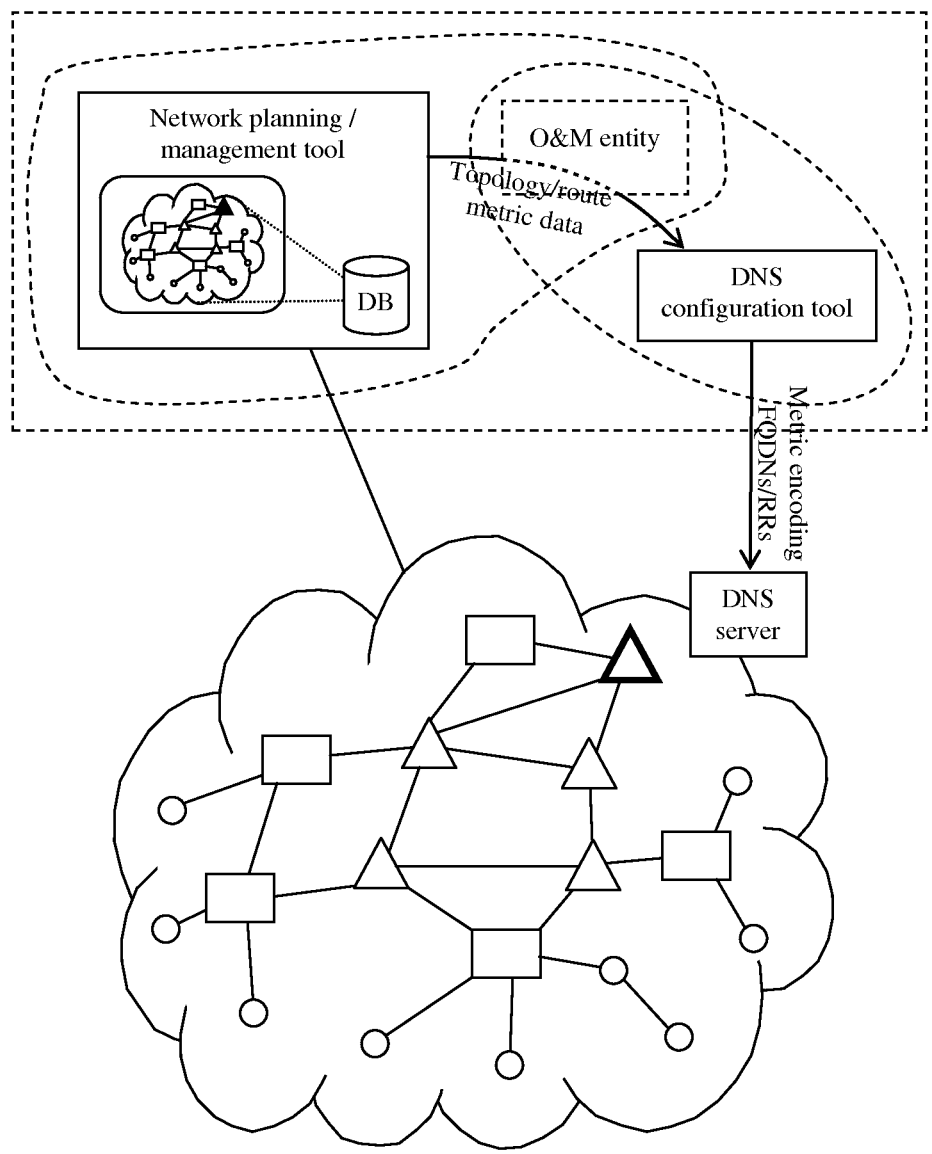
FIG. 8 illustrates a network and process for automation of configuration of route metric encoding FQDNs and resource records in a DNS server(s).

FIG. 8 illustrates this concept for automation of configuration of route metric encoding FQDNs and RRs in the DNS server(s). The dashed O&M entity shown in the figure may or may not be present as an intermediary relay or processor of the data. The other dashed shapes indicate various possible integrations of entities, i.e. the network planning/management tool and the intermediate O&M entity (if present) may be integrated, the DNS configuration tool and the intermediate O&M entity (if present) may be integrated, all three of them may be integrated or they may be realized as three (or two) separate entities.

Encoding Metrics of Routes Between Sites

As mentioned briefly above, a possible way to condense the route metric encoding data is to leverage the fact that core network nodes, in particular SGWs and PGWs, are typically deployed in groups at different sites. The routes between any node located at a certain site and any other node located at a certain other site, e.g. the routes between the nodes on site A and the nodes on site B, are typically equal and hence have the same route metric. Hence, encoding route metrics for the same inter-site route more than once is in principle redundant (even if the specific endpoint nodes at the sites differ). A more compact encoding recognizes the site location and encodes metrics of only one route between any given pair of sites. Translating such inter-site routes into inter-node routes, i.e. mapping a route between two nodes to the route between the nodes' respective sites, requires that the MME can identify the site where a given node is located.

To enable this possible optimization each node name (i.e. the set of FQDN labels constituting a node's name) should contain an encoding of the name or identity of the site where the node is located. Such site names/identities could advantageously be encoded as one or more FQDN labels in the node name. As for the internal structure (if any) of the side name/identity, this would be the choice of each operator, as long as the site name/identity contains only characters which are allowed in FQDN labels. The label(s) constituting the site name/identity is(are) referred to as the site name/identity label(s).

The route metrics encoded in FQDNs in the DNS server(s) should be associated with inter-site routes instead of inter-node routes. This is easily achieved by replacing the interface and node name labels with site name/identity label(s) and replacing the inter-node route related encodings with corresponding data for inter-site routes. Instead of a remote endpoint node ID a remote endpoint site ID would be used to indicate the remote endpoint of an inter-site route (i.e. the site at the other end of a route beginning at the site indicated by the site name/identity label(s) at the far right in the FQDN). A remote endpoint site ID should include an identifier of the concerned site, e.g. in the form of site name/identity label(s). The actual route metrics could be encoded in the same way as described for inter-node routes.

An example of an FQDN encoding metrics of multiple inter-site routes (i.e. corresponding to method 1 in the basic solution) could be: metric-<route metric>.<remote endpoint site ID>.route-metric.metric-<route metric>.<remote endpoint site ID>.route-metric.<site name/identity label(s)>. Examples of an FQDN encoding metrics of a single inter-site route (i.e. corresponding to method 2 in the basic solution) could be:

For Route Specific Requests:
<route metric>.<site name/identity label(s)>.
For Generic Requests:
<route metric>.<remote endpoint site ID>.<site name/identity label(s)>.

Optionally, the granularity of a site could be increased to take different routers attached to the site into account or even different interfaces of such routers. In such a case the site name/identity label(s) at the far right in the FQDN would have a router label or a router interface label appended to the left. However, introducing this increased granularity increases the number of routes for which metrics are to be encoded, while probably not providing any advantage, since the routing system will (more or less) always choose the same (best) route between two given sites anyway. Hence, this is not recommended.

DNS queries that trigger inter-site route metric encoding FQDNs to be returned could include as the "query name", i.e. the field in the query which is used to look up the DNS RR(s) to be returned, an FQDN (or domain name) including the site name/identity label(s) of a site, either as a part of a set of node name labels or alone (independent of node names). In any case the returned FQDN(s) should indicate inter-site route(s) independently of nodes on the sites.

The automation of the DNS configuration described above would be possible to use for inter-site routes too, since an operator would have maps of the network locations of the sites in databases, e.g. mapped to the IP subnet(s) used on each site.

If the option of building an overlay network graph to reduce the delay during the SGW/PGW selection procedures is used, the number of vertices ("nodes") in the graph would be fewer, since the core network nodes in the graph would be replaced by a smaller number of sites. The number of edges (interconnections) in the graph would be reduced even more, since the number of edges grows fast with increasing number of vertices.

Encoding Route Metrics in Domain Names

The route metrics conveyed in DNS RRs may be encoded in domain names, which are not FQDNs, e.g. in a sense incomplete. Route metric encoding domain names could be used instead of, or mixed/alternated with, route metric encoding FQDNs.

Encoding Route Metrics in Other DNS Parameters than FQDNs

Although perhaps less favourable, it is conceivable that the route metrics to be conveyed to MMEs via DNS may be encoded in other DNS parameters than FQDNs (or domain names), such as e.g. the service field or the regular expression (regexp) field of a NAPTR RR or in TXT RRs (text strings). [Note that a non-empty regexp field deviates from orthodox S-NAPTR, but it is allowed in the general NAPTR RR.]

Applying the Approach in 3G/UMTS

Although described above in terms of EPS, the proposed scheme may also be applied in 3G/UMTS networks. In 3G/UMTS the GGSN corresponds to the PGW and the combined control and user plane node SGSN corresponds to both the MME and the SGW. The SGSN is selected by the Node B (similar to the eNB's selection of the MME in EPS). Hence, since the control and user plane parts of a SGSN cannot be selected separately, the concept of SGW selection has no correspondence in 3G/UMTS networks. However, using the proposed scheme, and provided that the DNS server(s) has (have) been installed and configured accordingly, the SGSN could select the GGSN in the same manner as the MME selects the PGW in EPS networks.

The Methods 1 and 2 considered above rely on including within the DNS resource records a metric indicative of the quality or cost of a particular route, either between nodes or groups or a combination of nodes and groups. An alternative approach is to encode special metrics into the node FQDNs, which encode the positions of the different nodes in the network topology. That is, positions in multi-dimensional space (i.e. a two-dimensional graph in this case) are transformed into a one-dimensional value space (i.e., single numbers), preserving the spatial mappings as much as possible. The distances between nodes (or node groups) within the value space may be representative of a route quality or cost between the nodes or node groups.

An example encoding of a node (GW) position in the FQDN in its simplest form would look like:
GW_3213.Area1.backbone.AS1.Op1.net This FQDN has a structure similar to the output FQDNs encoded in the DNS as prescribed in the standard procedure, where GW3_213 is a unique identifier of a given GW. However, here the ID of "213" is not only a serial number but also encodes information about the placement the GW within the network topology (the serial number "3" is a distinguishing identifier of the GW). Note that in the encoding process it is the site that is used as the lowest hierarchical entity and not the node. This is because the route "cost" between two co-sited nodes may be considered negligible, while the route "costs" between any node located at a certain site and any other node located at a certain other site, e.g. the routes between the nodes on site A and the nodes on site B, are equal. Thus, one advantage of this method is that the full topology relations are not encoded into these numbers, and thus remain "invisible" to external networks (backward mapping from the one dimensional space to two dimensional space is difficult or impossible). Note that it is also possible to hide this limited topology information by encrypting the numbers, e.g., using a key which is common to all nodes in the network.

Two alternatives for encoding the extra topological information into a single one-dimensional ordering/encoding ID in the FQDN labels will now be described. Note that there are other known examples in the literature of how this encoding may be done (see e.g. Guo, D. and M. Gahegan, "Spatial Ordering and Encoding for Geographic Data Mining and Visualization" Journal of Intelligent Information Systems (2006)). A common factor, however, is that the distance between two nodes may be estimated as the difference between their metrics. For three nodes GWx, GWy and GWz with FQDNs:

GWx_456.Area1.backbone.AS1.Op1.net,
GWy_123.Area1.backbone.AS1.Op1.net, and
GWz_789.Area1.backbone.AS1.Op1.net, the distance from GWx to GWy is |456−123|=333, and the distance from GWx to GWz is |456−789|=333, i.e. in this case the two nodes GWy and GWz are equally far from GWx etc.

In a simplified form, a clustering algorithm may be described as follows:

Clustering: Consider each point as a cluster, set c=0 and, until there is only one cluster, increment c by one and form the c:th "super-cluster" by letting the two closest clusters, A and B say, form one large cluster, and record the distance between the two clusters as the furthest distance between any point a∈A and any point b∈B.

Ordering: For all super-clusters c≥1, order the two "sub-clusters", A and B say, by putting the points a∈A and b∈B next to each other, where a and b are the points with the smallest distance between.

Encoding: Encode the location of the first point as zero and encode the locations of all successive points as the accumulated distance to that site using the "cluster distances" defined in the first step. Finally, normalise all values by the largest value. In this way, it is possible to encode multiple distances into a single numerical value. Thus the size of the resulting FQDNs would increase just with a few characters compared to their original size.

Figure 9:
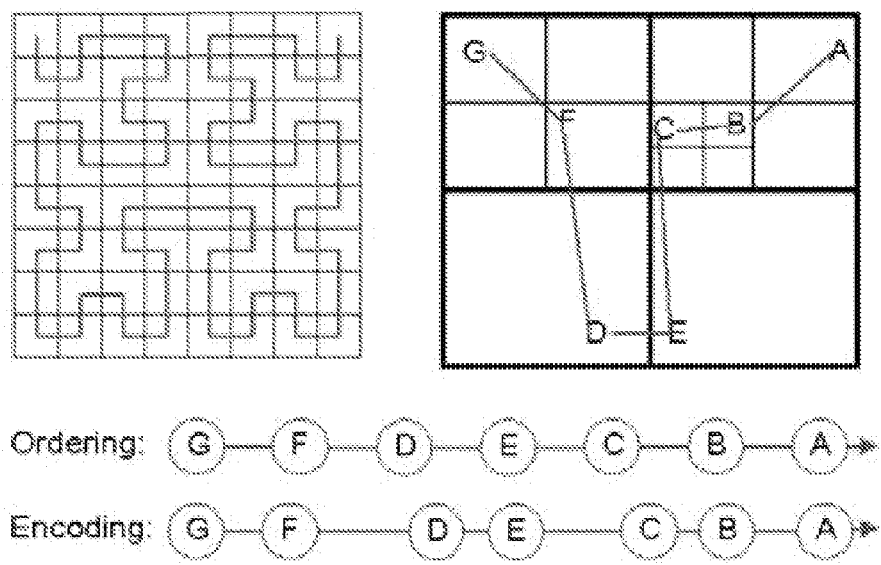
FIG. 9 illustrates schematically a one dimensional value space constructed for nodes within a packet core network.

Another position encoding example is the ordering and encoding with space-filling curves (Mark, D. M. (1990), "Neighbour-based Properties of Some Ordering of Two-dimensional Space." Geographical Analysis 22(2): 145-157). Given a data set of n points of any distribution in a 2D space, a minimum bounding square box that covers all data points is constructed. The square box (or quadrant) is recursively divided into four subquadrants until each subquadrant covers only one point. An ordering of all points can then be derived by causing a space-filling curve to visit each subquadrant (and thus each point). This is illustrated in FIG. 9 (using a Hilbert curve). Each data point is assigned an integer value as the ordering key (or ID). For example, let the left-most point in the ordering be 0 (zero), then its right neighbour will be 1, and so on. The right-most point in the ordering is then n−1, where n is the total number of spatial points. An encoding is constructed by adjusting distances between neighbouring points in the ordering so that it is proportional to their distance in the 2D space. For example, as shown in FIG. 9, let Encoding(G) be the encoding value of point G, the left-most point in the ordering, then Encoding(F)=Encoding (G)+GF, where point F is the right neighbour of G, and GF is the distance between G and F in the original space. This encoding method may be useful only for relatively dense topologies, where "distance" metrics on the network topology are comparable with the geographical distances between the nodes.

An assumption made thus far is that a number representing some "topological position" metric is encoded in the node FQDN in order to provide enhanced topology knowledge to the MMEs. However, it is possible to encode multiple numbers in the same FQDN or even in the same label at a certain FQDN hierarchy. In the following, four variants for multiple label encodings are described.

Label Encoding Based on Sub-Networks

Each encoding method that transforms a two-dimensional topology (graph) into a one dimensional topology (line) is only approximate, i.e., some information is lost. Numerical evaluations indicate that the information obtained is better the smaller the network (i.e., the smaller the network the less information is lost in the topology encoding)—see for example A. Arvidsson, "Gains from location and load aware node selection", PCR/Node Selection Project report 2009. This means that one should try to consider as small networks as possible in the encoding process.

Figure 10:
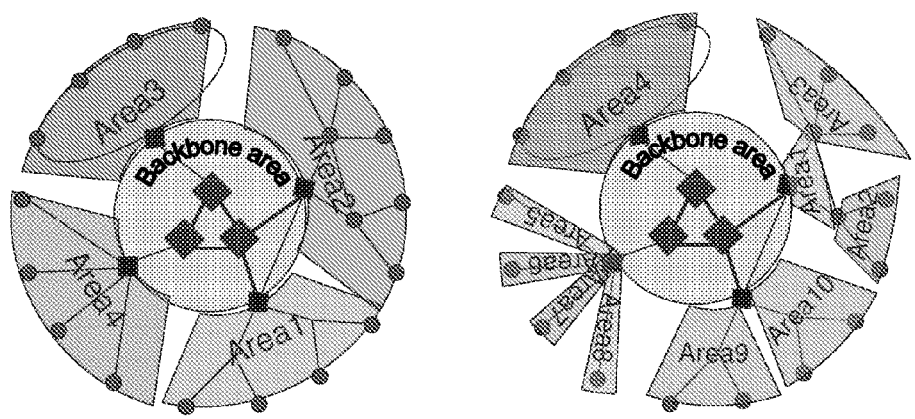
FIG. 10 illustrates schematically two different network architectures in which nodes are grouped into local and backbone areas.

It is therefore advantageous to use multiple encodings based on different sub-networks of the full domain, instead of using only one number to encode topology information of all sites. For example, assume the network to the left of FIG. 10. Then, the FQDN of a GW node in Area1 would look like:
GW3_<ID31>_local<_ID32>_all.Area1.backbone.AS1.Op1.net,
where ID31 is the number encoding the positions considering only the sites in Area1, while ID32 is an (less precise) encoding of the positions considering all nodes in the network (the strings "local" and "all" are introduced in FQDN to state the sub-network levels the given IDs represent). This means that the distance between two nodes in the same area could be computed from location information encoded in ID31 only, while the distance between nodes in different areas must be computed from the location information based on all nodes in the network, i.e., ID32. Since ID31 represents a more accurate encoding, this means that more accurate information will be available presumably for the majority of the selections (assuming that generally a selectable node will be available within short distance, i.e., in the same area). Note that the method may be extended to consider even more level encodings representing more sub-network levels in the operator network.

Label Encoding at Different Hierarchical Levels

Here we propose a simpler and more scalable encoding alternative that makes use of the hierarchical topology information defined by the FQDN structure. The idea consists of the following components:

Create an encoding number in the first label (node name label) IDs that is only based on the inter-site relations in the lowest hierarchical domain.

Apply a similar logic for the case of sites belonging to more hierarchical domains, i.e., the encoding used in the longer FQDN should represent the position in the lower hierarchical domain (e.g., an "Area"), while that used in the shorter FQDN should represent the position encoding in the higher hierarchical domain (e.g., in the "backbone")

The reason for using encoding only relative to the other GWs in the same area is to have a more precise position encoding in this region from where presumably the vast majority of peer selections for this GW will happen, and because numerical investigations (Å. Arvidsson, "Gains from location and load aware node selection" PCR/Node Selection Project report 2009) suggest that fewer nodes tend to increase the precision of the encoding.

The reason for the encodings at the higher hierarchical levels for the area border sites is to break the tie between the distances to nodes in different areas on the same hierarchical level. This is done in the following way:

The distance of the nodes relative to the border site(s) may be inferred from the node encodings and the encoding from the longer FQDN of the border site(s), respectively.

The relative distance of the border sites on the higher hierarchical domain may be inferred from the encodings from the shorter FQDNs of the border sites.

The overall distance then may be estimated as the sum of the two distances (if there are more distances in a given relation, the shortest of them should be considered).

Figure 11:
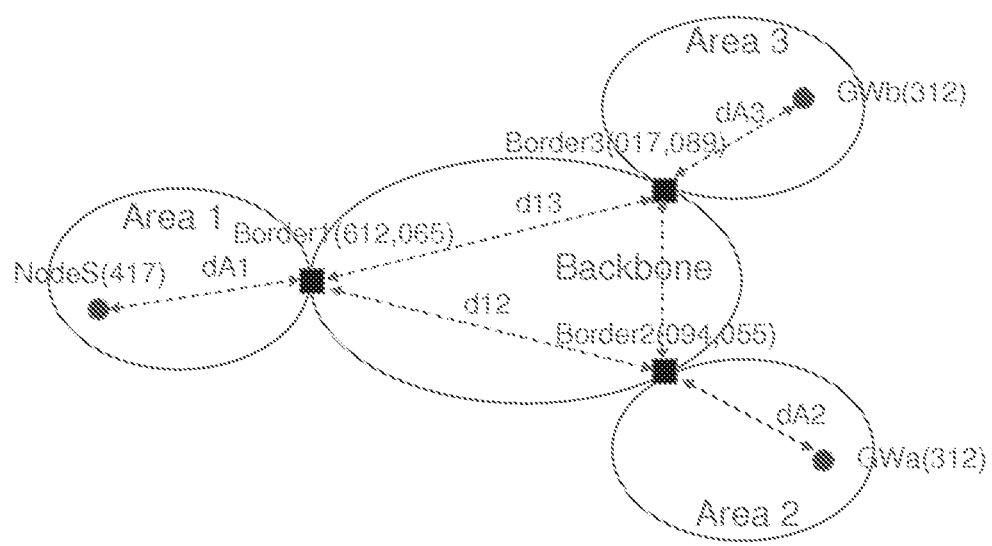
FIG. 11 illustrates schematically a packet core network architecture comprising a plurality of areas connected via border gateways.

For example, assume the scenario from FIG. 11, where it is desired to know the distance from a node NodeS which is in area 1 and which has the following FQDN:
NodeS_417.Area1.backbone.AS1.Op1.net,
to any of the nodes GWa or GWb which have the following FQDNs
GWa_674.Area2.backbone.AS1.Op1.net
GWb_312.Area3.backbone.AS1.Op1.net To do this it is necessary to know the FQDNs of the appropriate border nodes. Assuming that each area just has one node (more nodes only changes the length of the example) and that the names of these nodes are Border1, Border2 and Border3 (to Area1, Area2 and Area3 respectively).

These nodes may be encoded in FQDNs as
Border1_612.Area1.backbone.AS1.Op1.net and Border1_065.backbone.AS1.Op1.net,
Border2_094.Area2.backbone.AS1.Op1.net and Border2_055.backbone.AS1.Op1.net,
Border3_017.Area3.backbone.AS1.Op1.net and Border3_089.backbone.AS1.Op1.net.

The distance from NodeS to Border1 is dA1=|417−612|=195, the distances from Border1 to Border2 and Border3 respectively are d12=|065−055|=10 and d13=|065−089|=24, and finally the distance from Border2 to GWa is dA2=|094−674|=580 while the distance from Border3 to GWb is dA3=|017−312|=295.

The total distance from NodeS to GWa is thus dA1+d12+dA2=195+10+580=785 and the total distance from NodeS to GWb is dA1+d13+dA3=195+24+295=514. Hence it is determined that GWb is the closer of the two.

Note that the process requires that the FQDNs for the border nodes are known by the MME. There are different ways for the MME to obtain this information. For example, the MME may obtain the dual FQDNs for each of those nodes from the DNS. One solution is that the MME queries the DNS using input FQDNs (such as Area1.backbone.AS1.Op1.net). The DNS should reply with border nodes for Area1 as: Border1_612.Area1.backbone.AS1.Op1.net, and Border1_065.backbone.AS1.Op1.net, and so on.

This may be achieved by configuring multiple NAPTR RRs matching the corresponding query. Hence, when an MME sends a NAPTR query that matches these multiple RRs, all matching RRs will be returned to the MME, each of them containing one of the alias FQDNs in the replacement field. (If there are more border nodes in an area then more RRs are configured for the corresponding query)

An alternative approach that reduces the number additional DNS queries is to append also the name and encoding of the border nodes into the GW names (e.g., the FQDN of GWa in the example above would look like GWa_674_Border1_612.Area2.backbone.AS1.Op1.net. This enables the MME to recognize one of the FQDNs of the border nodes belonging to the given area; the other (shorter) FQDN may then be easily fetched in a subsequent query (e.g., by a simple A/AAAA query.

Note that it is also possible to perform "tie breaks" between distances towards GWs in the same remote area by using the same encoding and calculation method. Thus, this method is capable of estimating distance relations between any nodes coupled with the information about relative closeness coming from the hierarchical encodings.

The "distance" metric assumed in the label encodings does not necessarily represent geographical distance on the network topology. In fact, it is possible to encode multiple numbers in the FQDN, each number representing a metric of different type, e.g. the metric used by the routing protocol in the network (e.g. OSPF and/or IBGP), a delay related metric and a cost related metric (or any other combination of different metric types). Multiple label encodings may be useful for an MME during SGW/PGW selection in several ways.

If different "distance" metrics are used, then the MME may compare and evaluate different metrics, e.g. cost, delay and packet loss probability separately as three separate soft selection criteria and possibly balance them against each other (e.g. cost against delay etc.) as well as against other soft criteria.

The MME may also choose to use different metrics for different APNs (i.e. depending on the APN that is associated with the PDN connection that the SGW/GPW selection concerns). For instance, for an APN which indicates that delay sensitive services will be used, the MME may choose to emphasize a delay related metric. If the concerned PDN connection already has dedicated QoS bearers established, the MME may use the QoS as guidelines when using the route metrics. For instance, if the guaranteed bit rate (GBR) of one or more dedicated bearer or the aggregate maximum bit rate (AMBR) of the entire PDN connection is high (indicating that high data volume services are being used), then the MME may choose to emphasize a cost related metric.

Another example is that the MME may choose to use/emphasize different metric types based on the user's subscription type. For instance, using the gold-silver-bronze subscription paradigm, the MME may choose to emphasize delay and packet loss probability related metrics for gold subscribers, whereas a cost related metric may be emphasized for bronze subscribers.

As mentioned above, each encoding method that transforms a two-dimensional topology (graph) into a one dimensional topology (line) is only approximate, i.e., some information is lost. One way to diminish the impact of this approximation is to use multiple distance encoding numbers, each number representing the same metric but computed from a different encoding algorithm. That is, one may, e.g., use a few different algorithms, run them all on a topology and then give each node the numbers from all algorithms. Say that one selects three encoding algorithms A, B and C and that the node n gets the values $n\_a$, $n\_b$ and $n\_c$ from each of these respectively. [Note that these will be different from the basic fact that A, B and C are different.] Now, when the MME should select a closest node it may check the closest one with respect to each of the metrics/algorithms/numbers. The distance between two nodes m and n may thus be characterised by $|m\_a-n\_a|$, $|m\_b-n\_b|$ and $|m\_c-n\_c|$. An MME which is to find a closest node can examine a set of candidates i, j and k by, e.g., Averaging the distances according to A, B and C respectively, Ranking nodes i, j and k and computing the average rank, or By finding a safest bet such as a node which is close in all metrics A, B and C.

There are several other ways in which information may be assessed. The main point is that, by using several algorithms, one can avoid the weak spots of each individual algorithm (as it may be assumed that these are rare and different between different algorithms).

Some operators establish dedicated peering arrangement with each other in order to bypass inter-operator carriers. Such arrangements involve dedicated ASBRs to be used in roaming cases with home routed traffic involving the two operator's networks. Such roaming scenarios may be of interest in the context of the approach described here, since they include a preference for one (or a few) dedicated ASBR(s) (denoted $ASBR_d$).

The serving MME in the visited network is responsible for selecting both the SGW in the visited network and the PGW in the home network. When selecting the SGW in the visited network the MME should be able to derive metrics for the SGW-$ASBR_d$ distance. This distance is a part of the visited network and hence the DNS of the visited network can provide the requested information in the following way: The site containing the $ASBR_d$ is also considered when encoding the distance relations into the node labels. Thus, mutual distance relations may be calculated by the MME based on this information provided that the MME can infer the proper $ASBR_d$ site from the attach request. This information can be easily extracted from the APN.

It will be appreciated by those of ordinary skill in the art that various modifications may be made to the above described embodiments without departing from the scope of the present invention.

Abbreviations Used in the Above Text:
AAAA RR A DNS resource record for resolving a FQDN into an IPv6 address
AMBR Aggregate Maximum Bit Rate
APN Access Point Name
AS Autonomous System
ASBR Autonomous System Border Router
CP Control Plane
CN Core Network
DB Database
DDDS Dynamic Delegation Discovery System
DL Downlink
DNS Domain Name System
EDGE Enhanced Data rates for GSM Evolution
eNB eNodeB
EPC Evolved Packet Core
EPS Evolved Packet System
E-UTRAN Evolved UTRAN FQDN Fully Qualified Domain Name
F-TEID Fully qualified Tunnel Endpoint Identifier
GBR Guaranteed Bit Rate
GGSN Gateway GPRS Support Node
GERAN GSM EDGE Radio Access Network
GPRS General Packet Radio Service
GSM Global System for Mobile communication
GTP GPRS Tunnelling Protocol
GTP-C The control plane part of GTP.
GW Gateway
HSS Home Subscriber Server
IBGP Interior Border Gateway Protocol
ID Identity
IMS IP Multimedia Subsystem
IP Internet Protocol
IPv4 Internet Protocol version 4
IPv6 Internet Protocol version 6
M Route metric
MCC Mobile Country Code
MME Mobility Management Entity
MNC Mobile Network Code
NAPTR Name Authority Pointer (A DNS resource record type.)
O&M Operation and Maintenance
OSPF Open Shortest Path First
PCRF Policy and Charging Rules Function
PDN Packet Data Network
PGW PDN Gateway
PLMN Public Land Mobile Network
QoS Quality of Service
RFC Request For Comments
RR Resource Record
S1 The interface between an eNB and the EPS core network.
S1AP S1 Application Protocol (The protocol used over the S1-MME interface.)
S1-MME The control plane part of the S1 interface (between an eNB and an MME).
S1-U The user plane part of the S1 interface (between an eNB and a SGW).
SA Service Area
SCTP Stream Control Transmission Protocol
SeGW Security Gateway
SGSN Serving GPRS Support Node
SGW Serving Gateway
S-NAPTR Straightforward NAPTR
SRV The DNS Service resource record type.
TAC Tracking Area Code
TAI Tracking Area Identity
TAU Tracking Area Update
TS Technical Specification
UE User Equipment
UMTS Universal Mobile Telecommunications System
UP User Plane
UTRAN Universal Terrestrial Radio Access Network

The invention claimed is:
1. A method of allocating user plane nodes to a connection being established across a packet core network, the method comprising:
    maintaining at a Domain Name System (DNS) server:
        one or more DNS resource records for each available user plane node or group of neighbouring user plane nodes, and
        a DNS resource record containing a measure of a route quality or cost between the associated user plane node or group and each of one or more further user plane nodes or further groups of neighbouring user plane nodes of the packet core network to which said associated user plane node or group is connected;
    processing a connection establishment request at a mobility management control entity within the packet core network;
    sending a DNS query to a DNS server, the query containing one or more user plane node selection criteria;
    receiving the query at the DNS server and,
    on the basis of the or each criterion, identifying one or more DNS resource records satisfying the criteria/criterion, and returning at least said measure of route quality or cost of the identified DNS resource record(s) to said mobility management control entity; and
    receiving the measure(s) of route quality or cost of the identified DNS resource record(s) at the mobility management control entity, and using the measure(s) to allocate a user plane node or nodes to said connection.

2. The method according to claim 1, wherein each DNS resource record contains, for each said measure, an identity of the corresponding further user plane node or further group of neighbouring user plane nodes.

3. The method according to claim 1, wherein said packet core network is a 3GPP Evolved Packet Core network.

4. The method according to claim 3, wherein said mobility management control entity is a Mobility Management Entity (MME).

5. The method according to claim 4, wherein said DNS resource records are Name Authority Pointer (NAPTR) resource records.

6. The method according to claim 4, wherein the method is used to allocate one or more of the following user plane nodes to said connection:
    a Serving Gateway;
    a Packet Data Network Gateway; and
    an Autonomous System Border Router.

7. The method according to claim 5, wherein each DNS resource record is associated with one of the following user plane node types:
    a Security Gateway (SeGW);
    a Serving Gateway (SGW); and
    a Packet Data Network Gateway (PGW).

8. The method according to claim 7, wherein a given DNS resource record contains measures of the route qualities between the associated user plane node and a node or nodes of a different node type, or between the associated group of neighbouring user plane nodes and a group or groups of neighbouring user plane nodes of a different node type.

9. The method according to claim 8, wherein:
    a DNS resource record associated with an individual or group of Security Gateways contains measures of the route quality or cost between that Security Gateway or group and one or more Serving Gateways or Serving Gateway groups;
    a DNS resource record associated with an individual or group of Serving Gateways contains measures of the route quality or cost between that Serving Gateway or group and one or more Security Gateways and/or one or more Packet Data Network Gateways or groups of Security Gateways and/or Packet Data Network Gateways; and
    a DNS resource record associated with an individual or group of Packet Data Network Gateway contains measures of the route quality or cost between that Packet Data Network Gateway or group and one or more Serving Gateways or groups of Serving Gateways and/or between that individual or group of Packet Data Network Gateways and one or more individual or groups of Autonomous System Border Routers.

10. The method according to claim 1, wherein said packet core network is a 3G UMTS core network and said mobility management control entity is a Serving GPRS Support Node (SGSN) and said user plane nodes include SGSNs and Gateway GPRS Support Nodes (GGSNs).

11. The method according to claim 1, wherein said measure(s) contained within a DNS resource record form part of a domain name or a Fully Qualified Domain Name (FQDN) identifying the associated user plane node or group of user plane nodes, and the method comprises returning the entire domain name or FQDN to the mobility management control entity.

12. The method according to claim 1, wherein said DNS server holds, for each of one or more available user plane nodes, two or more DNS resource records so that, upon receipt of said query, the DNS server may return the measures of route quality or cost of those two or more DNS resource records and, upon receipt of the measures by the mobility management control entity, the entity combines the measures contained in the resource records.

13. A method of allocating user plane nodes to a connection being established across a packet core network, the method comprising:
receiving a connection establishment request;
in response to receipt of the connection establishment request, sending a Domain Name System (DNS) query to a DNS server, the query containing one or more user plane node selection criteria;
receiving a response from the DNS server, the response containing measures of route quality or cost associated with one or more DNS resource records satisfying said criterion or criteria; and
allocating a user plane node to the connection being established using one or more received measures of route quality or cost, wherein each measure is attributed to a route between an individual or group of user plane nodes associated with the corresponding resource record and a further user plane node or further group of user plane nodes to which that associated node or group of nodes is connected.

14. The method according to claim 13 and comprising carrying out said steps at one of a Mobility Management Entity (MME), of a 3GPP Evolved Packet Core network, and a 3GPP UMTS Serving GPRS Support Node (SGSN).

15. An apparatus configured to operate as a mobility management control entity within a packet core network, the apparatus comprising:
a connection establishment handler for processing a connection establishment request; and
a user plane network node selector having:
a Domain Name System (DNS) query sending unit responsive to receipt of a connection establishment request for sending a DNS query to a DNS server, the query containing one or more user plane node selection criteria,
a DNS query response receiving unit for receiving a response from the DNS server, the response containing one or more measures of route quality or cost associated with DNS resource records satisfying said criterion or criteria, and
a user plane node allocation unit for allocating a user plane node to the connection being established using the one or more received measures, wherein each measure is attributed to a route between a user plane node or group of user plane nodes associated with the resource record and a further user plane node or further group of user plane nodes to which that associated node or group of nodes is connected.

16. An apparatus configured to operate as a Domain Name System (DNS) server within a packet core network comprising a plurality of user plane nodes, the apparatus comprising:
a memory storing one or more DNS resource records for each available user plane node or for each available group of user plane nodes, a DNS resource record containing a measure of a route quality or cost between the associated user plane node or group and each of one or more further user plane nodes or groups of nodes of the packet core network to which said associated user plane node or group is connected;
a DNS query receiving unit for receiving from a mobility management control entity a DNS query, the query containing one or more user plane node selection criteria;
a DNS resource record identifier unit for identifying one or more DNS resource records satisfying the criteria/criterion; and
a DNS query response unit for returning the or each measure of route quality or cost of the identified DNS resource record(s) to said mobility management control entity.

17. A method of allocating user plane nodes to a connection being established across a packet core network, the method comprising:
maintaining at a Domain Name System (DNS) server, one or more DNS resource records for each available user plane node or group of neighbouring user plane nodes, a DNS resource record containing a numerical value or values indicative of a position of the associated user plane node or group of nodes, relative to other user plane nodes or groups of user plane nodes, within a value space;
processing a connection establishment request at a mobility management control entity within the packet core network;
sending a DNS query to a DNS server, the query containing one or more user plane node selection criteria;
receiving the query at the DNS server and, on the basis of the or each criterion,
identifying one or more DNS resource records satisfying the criteria/criterion, and returning said numerical value or values of the identified DNS resource record(s) to said mobility management control entity; and
receiving the numerical value(s) at the mobility management control entity, and using these to allocate a user plane node or nodes to said connection.

18. The method according to claim 17, wherein said step of using the received numerical value(s) to allocate a user plane node or nodes to said connection comprises evaluating a function using as inputs the received numerical value(s) and numerical values associated with other candidate nodes or groups of nodes for the connection being established, where the results represent a measure of inter-node or inter-group route quality or cost.

19. The method according to claim 18, wherein said function is a difference.

20. The method according to claim 17, wherein said numerical value or values is or are included within a Fully Qualified Domain Name (FQDN) of a DNS resource record, the FQDN uniquely identifying the user plane node or group of user plane nodes within the packet core network.

21. The method according to claim 17, wherein a DNS resource record includes, for the associated user plane node or group of nodes, a numerical value or values indicative of a position of the associated user plane node or group of nodes, relative to other user plane nodes or groups of user plane nodes, for each of two or more value spaces.

22. The method according to claim 21, wherein a value space represents one of a route quality space and a cost space.

23. The method according to claim 17, wherein a DNS resource record includes, for the associated user plane node or group of nodes, an identity of the value space.

24. An apparatus configured to operate as a mobility management control entity within a packet core network, the apparatus comprising:
a connection establishment handler for processing a connection establishment request; and
a user plane network node selector having
a Domain Name System (DNS) query sending unit responsive to receipt of a connection establishment request for sending a DNS query to a DNS server, the query containing one or more user plane node selection criteria,
a DNS query response receiving unit for receiving a response from the DNS server a response containing one or more DNS resource records satisfying said criterion or criteria, and
a user plane node allocation unit for allocating a user plane node to the connection being established using one or more numerical values contained in the or each received resource record, a numerical value being indicative of a position of the associated user plane node or group of nodes, relative to other user plane nodes or groups of user plane nodes, within a value space.

25. The apparatus according to claim 24, said user plane node allocation unit being further configured to determine a difference between the received numerical value(s) and numerical values associated with other candidate nodes or groups of nodes for the connection being established, where the difference or difference represent a measure of inter-node or inter-group route quality or cost.

26. A method of allocating user plane nodes to a connection being established across a packet core network, the method comprising:
maintaining at a Domain Name System (DNS) server, one or more DNS resource records for each available user plane node or group of neighbouring user plane nodes, a DNS resource record containing a Fully Qualified Domain Name (FQDN) comprising a numerical value or values indicative of a position of the associated user plane node or group of nodes, relative to other user plane nodes or groups of user plane nodes, within a value space representative of one of route cost or route quality;
processing a connection establishment request at a mobility management control entity within the packet core network;
sending a DNS query to a DNS server, the query containing one or more user plane node selection criteria;
receiving the query at the DNS server and, on the basis of the or each criterion,
identifying one or more DNS resource records satisfying the criteria/criterion, and returning the FQDN(s) of the identified DNS resource record(s) to said mobility management control entity; and
receiving FQDN(s) at the mobility management control entity, and using the associated numerical value(s) to allocate a user plane node or nodes to said connection.

27. A method of allocating user plane nodes to a connection being established across a packet core network, the method comprising:
maintaining at a Domain Name System (DNS) server a resource record for user plane nodes of the network, a resource record containing a Fully Qualified Domain Name (FQDN) identifying the associated user plane node, and the FQDN comprising a numerical value indicative of the relative position of the user plane node within a value space representing route quality and/or cost within the network; and
retrieving relevant FQDNs at a mobility management and control entity and evaluating differences between numerical values of the FQDNs in order to identify optimal nodes for the connection.

* * * * *